United States Patent
Englander et al.

(10) Patent No.: US 9,623,802 B2
(45) Date of Patent: *Apr. 18, 2017

(54) MIRROR MONITOR USING TWO LEVELS OF REFLECTIVITY AND TRANSMISSIBILITY

(71) Applicant: Rosco, Inc., Jamaica, NY (US)

(72) Inventors: Benjamin Englander, Woodmere, NY (US); Julian Serer, Plainview, NY (US); Peter Plate, Northport, NY (US); Gary Balsam, East Brunswick, NJ (US)

(73) Assignee: ROSCO, INC., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,260

(22) Filed: Dec. 15, 2015

(65) Prior Publication Data

US 2016/0167585 A1 Jun. 16, 2016

Related U.S. Application Data

(63) Continuation of application No. 14/480,887, filed on Sep. 9, 2014, now Pat. No. 9,215,429.

(Continued)

(51) Int. Cl.
*H04N 7/18* (2006.01)
*B60R 1/12* (2006.01)
(Continued)

(52) U.S. Cl.
CPC ............... *B60R 1/12* (2013.01); *B05D 5/063* (2013.01); *B05D 7/54* (2013.01); *B60R 1/04* (2013.01); *B60R 1/08* (2013.01); *G06F 3/16* (2013.01); *H04N 5/2252* (2013.01); *H04N 5/2253* (2013.01); *H04N 5/23293* (2013.01); *H04N 5/247* (2013.01); *H04N 5/268* (2013.01); *H04N 7/181* (2013.01); *H04N 7/183* (2013.01); *B60R 2001/1215* (2013.01); *B60R 2001/1253* (2013.01); *B60R 2001/1276* (2013.01);

(Continued)

(58) Field of Classification Search
None
See application file for complete search history.

(56) References Cited

U.S. PATENT DOCUMENTS 5,874,989 A * 2/1999 O'Brien ................. H04N 7/183
340/433
5,956,181 A * 9/1999 Lin ........................... B60R 1/12
359/630

(Continued)

*Primary Examiner* — Dakshesh Parikh
(74) *Attorney, Agent, or Firm* — Manatt, Phelps & Phillips, LLP

(57) ABSTRACT

A rear-view mirror and modular monitor system and method include an interior mirror that embeds a modular monitor behind see-through mirror glass. In some embodiments, the system includes multiple cameras, some in the vehicle, bus and/or truck, as well as some cameras outside the vehicle, bus and/or truck, advantageously providing the driver an opportunity to view what is happening, for example, in the back rows of the bus and/or cabin, while also using the mirror to look at objects in the bus and/or cabin that are visible using the mirror. The rear-view mirror and modular monitor system is configured to be easily assembled and/or disassembled when necessary for maintenance and/or to replace parts.

24 Claims, 16 Drawing Sheets

Related U.S. Application Data

(60) Provisional application No. 61/881,712, filed on Sep. 24, 2013.

(51) Int. Cl.
| | | |
|---|---|---|
| *B60R 1/04* | (2006.01) | |
| *B05D 5/06* | (2006.01) | |
| *B05D 7/00* | (2006.01) | |
| *B60R 1/08* | (2006.01) | |
| *G06F 3/16* | (2006.01) | |
| *H04N 5/225* | (2006.01) | |
| *H04N 5/232* | (2006.01) | |
| *H04N 5/247* | (2006.01) | |
| *H04N 5/268* | (2006.01) | |

(52) U.S. Cl.
CPC ... *B60R 2300/105* (2013.01); *B60R 2300/205* (2013.01); *B60R 2300/70* (2013.01); *B60R 2300/8006* (2013.01); *B60R 2300/8026* (2013.01)

(56) References Cited

U.S. PATENT DOCUMENTS

| | | | |
|---|---|---|---|
| 2005/0185936 A9* | 8/2005 | Lao | G08B 13/19647 386/210 |
| 2006/0164230 A1* | 7/2006 | DeWind | B60K 35/00 340/461 |
| 2009/0040588 A1* | 2/2009 | Tonar | B60Q 1/2665 359/267 |
| 2009/0244740 A1* | 10/2009 | Takayanagi | B60R 1/00 359/839 |
| 2010/0225762 A1* | 9/2010 | Augst | B60R 1/00 348/148 |

* cited by examiner

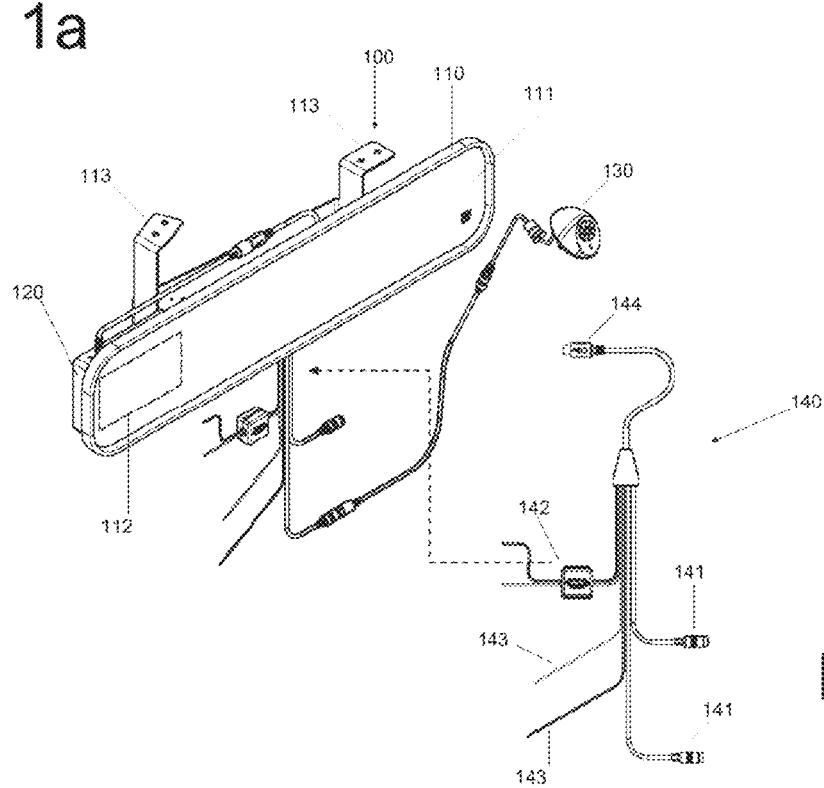

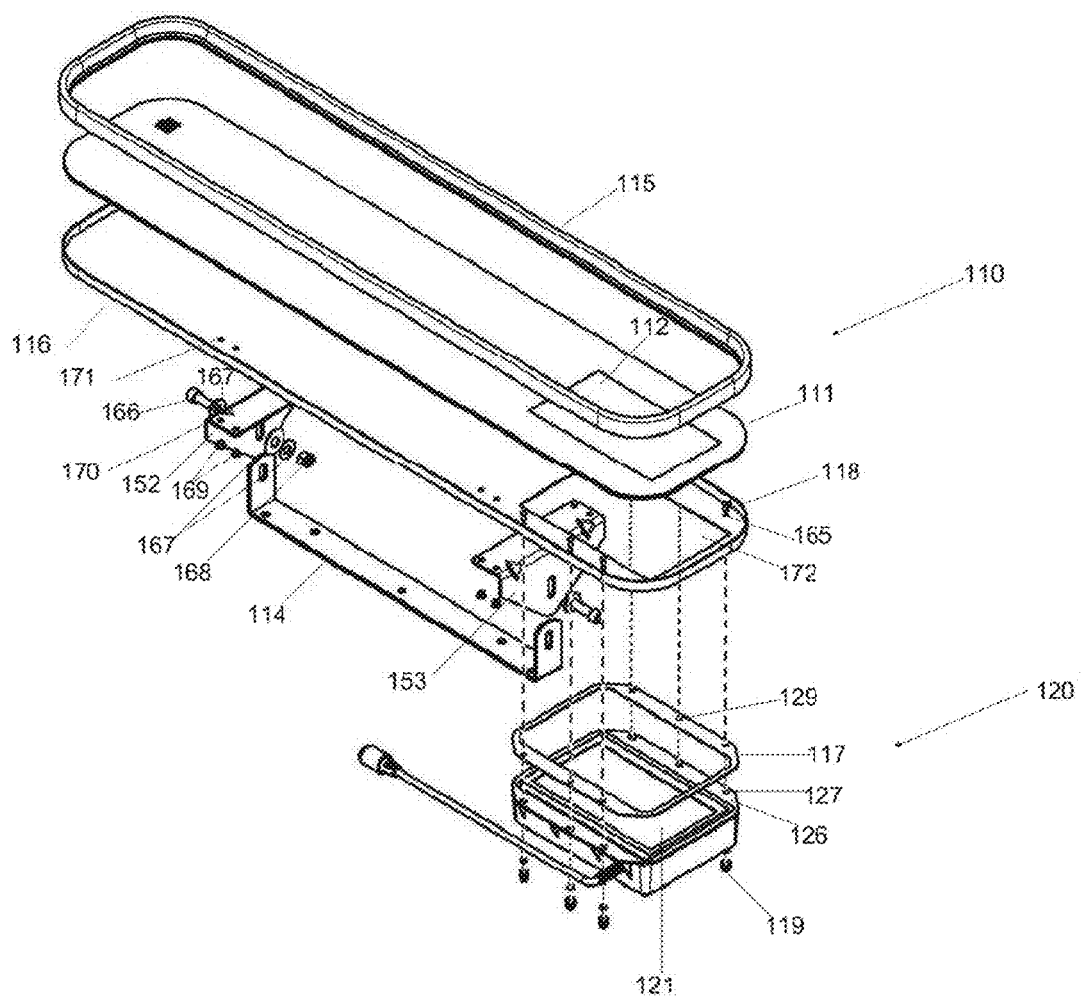

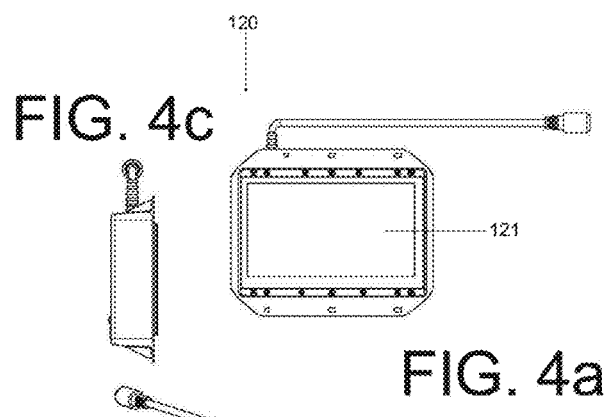
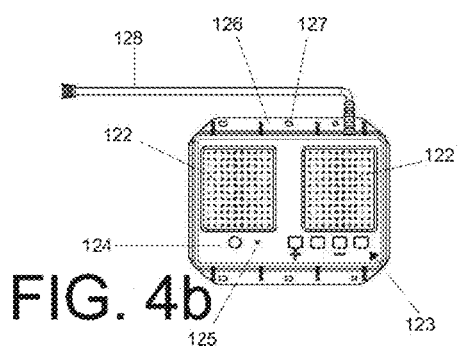
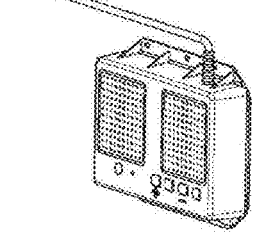
FIG. 4a
FIG. 4b
FIG. 4c
FIG. 4d
FIG. 4e

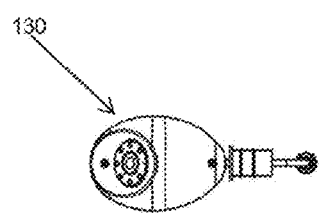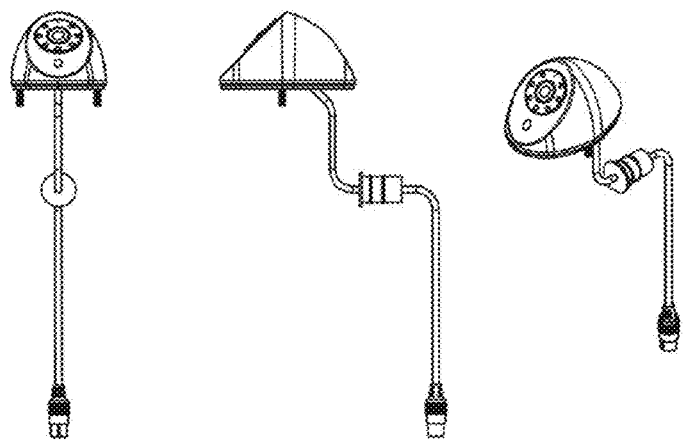
FIG. 5a
FIG. 5b    FIG. 5c    FIG. 5d

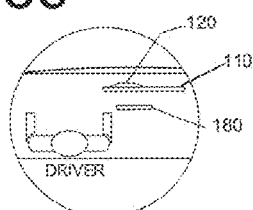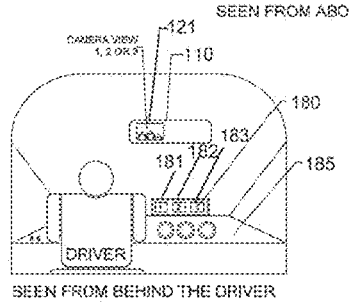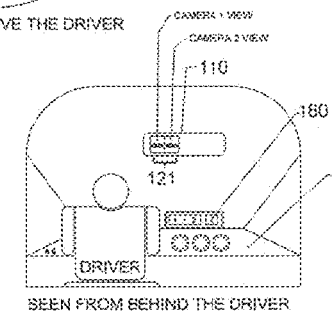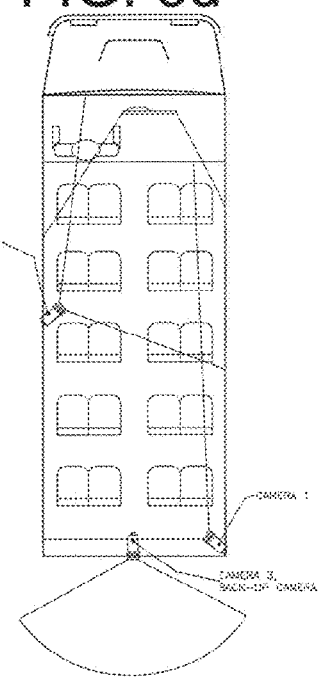

MIRROR MONITOR USING TWO LEVELS OF REFLECTIVITY AND TRANSMISSIBILITY

CROSS-REFERENCE TO RELATED APPLICATIONS

This application claims priority to U.S. application Ser. No. 14/480,887, filed Sep. 9, 2014, now U.S. Pat. No. 9,215,429, which claims priority to Provisional Application No. 61/881,712, filed Sep. 24, 2013, the contents of which is hereby incorporated by reference in their entirety. This application is related to U.S. patent application Ser. No. 13/664,419, filed Oct. 31, 2012, which claims priority to Provisional Application No. 61/553,532, filed Oct. 31, 2011, the contents of which are each hereby incorporated by reference in their entirety.

RELATED FIELD

A vehicle monitoring system and methods of use are provided. In some embodiments, a rear-view mirror and modular monitor system for enhanced viewing by a vehicle operator of areas within and/or exterior to a vehicle, and methods of using the system, are provided. In some embodiments, the rear-view mirror and modular monitor system is configured for use on a bus, school bus and/or public transit vehicle.

BACKGROUND

Existing vehicle monitoring systems capture still images and/or video images, and display the images on a monitor for the vehicle operator to view. For example, many large vehicles are equipped with a back-up camera and a monitor to assist the vehicle operator in moving the vehicle in reverse. However, such monitors can be a cause of excessive distraction for the vehicle operator, depending on their location.

In addition, many monitoring systems are installed such that, due to the configuration of the parts, and the method of installation, should an integral part like the monitor malfunction, accessing, fixing and/or replacing the integral part is often cumbersome and expensive.

SUMMARY

Accordingly, a rear-view mirror and modular monitor system is provided that includes an interior mirror that in some embodiments embeds a modular monitor behind, for example, see-through mirror glass. In some embodiments, the system includes multiple cameras, some in the vehicle, bus, school bus, public transit vehicle and/or truck, as well as some cameras outside the vehicle, bus, school bus, public transit vehicle and/or truck, advantageously providing the driver, other individual and/or other vehicle passenger an opportunity to view what is happening, for example, in the back rows of the bus and/or cabin, while also using the mirror to look at objects in the bus and/or cabin that are visible using the mirror.

Embodiments of the rear-view mirror and modular monitor system enable the maximizing of safe usage by automating when the modular monitor will display images, and when the driver will have full view of the rear-view mirror. For example, one type of automation is time based, wherein a certain intervals images are displayed (e.g., during hours when it is known that children will be on-board a bus).

Another type of automation is event-based, wherein an image may be displayed when the door of vehicle is opened, when red flashers are activated, and/or when the stop arm is activated. Images from a rear-view camera may be displayed in some embodiments only when the vehicle is placed in reverse. In some embodiments, two or more of the above automated viewing features may be used in combination.

In some embodiments the system comprises manual input selection, for use in certain situations. For example, when a driver cannot see activity happening behind high seat backs or otherwise outside the view of the driver, even with a rear-view mirror, a driver may choose to view such activity without having to stop the vehicle or adjust the rear-view mirror.

In some embodiments, audio may be provided to the vehicle operator in coordination with video being displayed. For example, a driver may have a need to hear audio from an area inside or outside the vehicle. Embodiments of the system therefore provide microphones at or near locations where cameras are capturing images, and the audio can be provided to the driver along with the images, by way of a speaker, headset, or the like. Such microphones may be built in to the cameras, or stand-alone devices.

Additionally, in some embodiments, the rear-view mirror and modular monitor system is configured to be easily assembled and/or disassembled when necessary. The rear-view mirror and modular monitor system is provided wherein parts can be attached and/or detached and parts can be replaced easily, as necessary.

In one exemplary embodiment, a rear-view mirror and modular monitor system enhances viewing for a vehicle operator of areas within and/or exterior to a vehicle. The system includes a rear-view mirror mounted forward of the vehicle operator and at a location unobstructed by the vehicle operator's forward field of view. The system includes a section of the rear-view mirror including a see-through mirror glass and/or a display aperture and a monitor module fastened to a rear side of the rear-view mirror and aligned with the see-through mirror glass section and/or the display aperture. A first image capture device is mounted at a first location inside and/or outside the vehicle, and configured to capture and transmit a first image that is displayable on the monitor module. In some embodiments, when the first image is transmitted to and displayed on the monitor module, the first image is viewable through the see-through mirror glass section and/or the display aperture.

In some embodiments, the system further includes a gasket disposed between the see-through mirror glass section and the monitor module configured to channel visible light emitted from a display on the monitor module through the see-through mirror glass section and/or the display aperture of the rear-view mirror, while providing protection for the display when the monitor module is fastened to the rear-view mirror. In some embodiments, the gasket is shaped so as to be proximately alignable with a perimeter of the display.

In some embodiments, the monitor module is configured to be removable from the rear-view mirror and reinsertable in the same rear-view mirror and/or another rear-view mirror. In some embodiments, the system further includes an image storage device configured for image storage.

In some embodiments, the system further includes a protective enclosure encasing the first image capture device and the image storage device and protecting the first image capture device and the image storage device from damage, tampering, and/or theft.

In some embodiments, the system further includes a connection device temporarily connecting the monitor module to the rear-view mirror and enabling the monitor module to be removed from and re-connected to or replaced from at the rear-view mirror and/or another rear-view mirror.

In some embodiments, the first image is captured, transmitted, and/or displayed responsive to a manually selected view, an automatically selected view, and/or an event-triggered selected view.

In some embodiments, the system further includes a second image capture device mounted at a second location inside and/or outside the vehicle, and configured to capture and transmit a second image to the monitor module. In some embodiments, the system further includes an input switch connected to the first image capture device and the second image capture device, and configured to provide the first image and the second image to the monitor module responsive to a manually selected view, an automatically selected view, and/or an event-triggered selected view. In some embodiments, the monitor module further includes two or more channels configured to receive the first image and the second image. The monitor module is further configured to display the first and second images either together in a multiple-feed configuration (mode) or individually in a single-feed configuration (mode) responsive to the input switch.

In some embodiments, the system further includes a first audio capture device mounted at a first location inside and/or outside the vehicle. The monitor module further includes a first audio input and an audio output device. In some embodiments, the first audio capture device is configured to capture a first audio signal and provide the first audio signal to the first audio input, and output device of the monitor module is configured to provide the first audio signal to the vehicle operator. In some embodiments, the first location of the first audio capture device is in a location that is proximate to the first location of the first image capture device, and the monitor module is configured to provide the first audio signal to the vehicle operator responsive to the first image being displayed on the monitor module.

In some embodiments, the see-through mirror glass section is configured so as to be reflective when no image is displayed on the monitor module, and sufficiently transparent for the first image to be viewable when the first image is displayed on the monitor module. In other embodiments, the rear-view mirror has a unitary reflecting surface and includes at least two areas of different reflectivity: a first area having a relatively low reflectivity, and a second area, such as the remaining area of the reflecting surface, having a higher reflectivity. In certain embodiments, the reflectivity of the two areas is selected such that the difference in reflectivity of the first area and the second area is not visible or perceivable under normal operation conditions and/or when the monitor is turned off.

In some embodiments, the monitor module further includes a photocell light sensor configured to detect ambient light at, around, or in a location affecting the location of the monitor module. In some embodiments, the monitor module is further configured to adjust a brightness level of the first image when the first image is displayed, responsive to the photocell light sensor.

In another exemplary embodiment, a rear view mirror and modular monitor system for enhanced viewing by a vehicle operator of areas within and/or exterior to a vehicle is provided. The system comprises a rear-view mirror mounted forward of the vehicle operator and at a location unobstructive of the vehicle operator's forward field of view, at least a section of said rear-view mirror comprising see-through mirror glass. In the system, a monitor module is fastened to a rear side of the rear-view mirror, aligned with the see-through mirror glass section. In some embodiments, a first image capture device is mounted at a first location inside and/or outside the vehicle, and is configured to provide a first image displayable on the monitor module. In some embodiments, the system further includes a second image capture device mounted at a second location inside and/or outside the vehicle configured to provide a second image displayable on the monitor module. In some embodiments, an input switch is connected to the first and second image capture devices, and is configured to provide the first image and/or the second image to monitor module responsive to a manually selected view, an automatically selected view, and/or an event-triggered selected view.

In some embodiments, when the first image and/or the second image is provided to and displayed on the monitor module, the first image and/or the second image is viewable through the see-through mirror glass section.

In some embodiments, the system further includes a first audio capture device mounted proximate to the first location of the first image capture device and a second audio capture device mounted proximate to the second location of the second image capture device. The monitor module further includes a first audio input, a second audio input, and at least one audio output device. In some embodiments, the first audio capture device is configured to capture a first audio signal and provide the first audio signal to the first audio input, and the second audio capture device is configured to capture a second audio signal and provide the second audio signal to the second audio input. In some embodiments, the audio output device is configured to provide the first audio signal to the vehicle operator responsive to the first image being displayed on the monitor module, and/or the second audio signal responsive to the second image being displayed on the monitor module. In some embodiments, the system further includes an image storage device configured to store the first image and/or the second image.

In another exemplary embodiment, a method of providing a rear-view mirror and modular monitor system for enhanced viewing by a vehicle operator of areas within and/or exterior to a vehicle is provided. The system includes the sequential, non-sequential, and/or sequence-independent steps of mounting a rear-view mirror forward of the vehicle operator and at a location unobstructed by the vehicle operator's forward field of view, a section of said rear-view mirror including see-through mirror glass. In some embodiments, the method further includes fastening a monitor module to a rear side of the rear-view mirror aligned with the see-through mirror glass section. The method further includes mounting a first image capture device at a first location inside and/or outside the vehicle configured to capture and transmit a first image to the monitor module. The method further includes connecting the first image capture device to the monitor module, using a wired and/or wireless connection, to provide the first image to the monitor module viewable through the see-through mirror glass section.

In some embodiments, the method further includes installing a gasket between the see-through mirror glass section and the monitor module to channel visible light emitted from a display on the monitor module through the at least one see-through mirror glass section of the rear-view mirror, while providing protection for the display when the monitor module is fastened to the rear-view mirror. In some embodiments, the method further includes aligning the gasket with a perimeter of the display and securing the gasket in place.

In some embodiments, the method further includes configuring the monitor module to be removable from the rear-view mirror and reinsertable in the same rear-view mirror and/or another rear-view mirror. In some embodiments, the method further includes providing an image storage device configured for image storage. In some embodiments, the method further includes providing a protective enclosure encasing the first image capture device and the image storage device to protect the first image capture device and the image storage device from damage, tampering, and/or theft.

In some embodiments, the step of fastening the monitor module to the rear side of the rear-view mirror further includes temporarily connecting the monitor module to the rear-view mirror using a connection device and enabling the monitor module to be removed from and re-connected to or replaced from the rear-view mirror and/or another rear-view mirror. In some embodiments, the first image is captured, transmitted, and/or displayed responsive to a manually selected view, an automatically selected view, and/or an event-triggered selected view.

In some embodiments, the method further includes mounting a second image capture device at a second location inside and/or outside the vehicle, the second image capture device being configured to capture and transmit a second image to the monitor module. In some embodiments, the system further comprises installing and/or connecting an input switch to the first and second image capture devices, and providing the first image and/or second image to the monitor module responsive to a manually selected view, an automatically selected view, and/or an event-triggered selected view. In some embodiments, the method further includes providing the monitor module with two or more channels configured to receive the first image and the second image; and displaying the first and second image together in a multiple-feed configuration (mode) and/or individually in a single-feed configuration (mode) responsive to the input switch.

In some embodiments, the method further includes mounting a first audio capture device at a first location inside and/or outside the vehicle, and providing the monitor module with a first audio input and an audio output device. In some embodiments, the method further includes capturing a first audio signal using the first audio capture device and providing the first audio signal to the first audio input of the monitor module; and providing the first audio signal to the vehicle operator using the audio output.

In some embodiments, the step of mounting the first audio capture device includes mounting the first audio capture device proximate to the first location of the first image capture device. In some embodiments, the monitor module is configured to provide the first audio signal to the vehicle operator responsive to the first image being displayed on the monitor module. In some embodiments, the method further includes configuring the see-through mirror glass section so as to be reflective when no image is displayed on the monitor module, and sufficiently transparent for the first image to be viewable when the first image is displayed on the monitor module.

In some embodiments, the method further includes providing the monitor module with a photocell light sensor configured to detect ambient light at, near, or affecting the location of the monitor module, wherein the monitor module is further configured to adjust a brightness level of the first image when the first image is displayed, responsive to the photocell light sensor.

In yet another exemplary embodiment, a method of providing a rear-view mirror and modular monitor system for enhanced viewing by a vehicle operator of areas within and/or exterior to a vehicle is provided. The method includes the sequential, non-sequential, and/or sequence-independent steps of: mounting a rear-view mirror forward of the vehicle operator and at a location that does not obstruct the vehicle operator's forward field of view, a section of the rear-view mirror comprising see-through mirror glass. The method further includes fastening a monitor module to a rear side of the rear-view mirror aligned with the see-through mirror glass section. The method further includes mounting a first image capture device at a first location inside and/or outside the vehicle to provide a first image to the monitor module, and mounting a second image capture device at a second location inside and/or outside the vehicle, the second image capture device being configured to provide a second image to the monitor module.

In some embodiments, the method further includes connecting an input switch to the first and second image capture devices using a wired and/or wireless connection, to provide the first image and/or the second image to the monitor module responsive to a manually selected view, an automatically selected view, and/or an event-triggered selected view. The method further includes digitally capturing the first image by the first image capture device and/or the second image by the second image capture device, and digitally transmitting the first image and/or the second image to the monitor module responsive to the manually selected view, the automatically selected view, and/or the event-triggered selected view. In some embodiments, the method further includes displaying the first image and/or the second image on the monitor module viewable through the see-through mirror glass section.

In some embodiments, the method further includes mounting a first audio capture device proximate to the first location of the first image capture device and a second audio capture device proximate to the second location of the second image capture device. The method further includes providing the monitor module with a first audio input, a second audio input, and an audio output device. In some embodiments, the method further includes capturing a first audio signal with the first audio capture device, and transmitting the first audio signal to the first audio responsive to the capturing of the first image; and capturing a second audio signal with the second audio capture device, and transmitting the second audio signal to the second audio input responsive to the capturing of the second image. The method further includes providing the first audio signal to the vehicle operator via the audio output device responsive to the first image being displayed in the single-feed configuration on the monitor module; and providing the second audio signal to the vehicle operator via audio output device responsive to the second image being displayed in the single-feed configuration on the monitor module.

In some embodiments, the method further includes providing an image storage device and storing first image and/or the second image in the image storage device.

In still another exemplary embodiment, a method of repairing a rear view mirror and modular monitor system, the system including a rear-view mirror mounted forward of the vehicle operator and at a location that does not obstruct the vehicle operator's forward field of view, a monitor module fastened to a rear side of the rear-view mirror, a first image capture device mounted at a location inside and/or outside the vehicle, and configured to provide a first image to the monitor module. The method includes the sequential, non-sequential, and/or sequence-independent steps of: unfastening the monitor module from the rear side of the rear-view mirror; replacing the monitor module and/or the rear-view mirror with a replacement part comprising another of another monitor module or another rear-view mirror. In some embodiments, the method further includes positioning the monitor module with respect to a see-through mirror glass and/or a display aperture of the rear-view mirror. Some embodiments include positioning a gasket between the monitor module and the see-through mirror glass and/or a display aperture, and refastening the fasteners to secure the replacement part to replace the monitor module and/or the rear-view mirror.

In some embodiments, the step of unfastening the monitor module from the rear side of the rear-view mirror further includes locating a plurality of fasteners, the fasteners having been threaded through a plurality of mirror apertures positioned around the see-through mirror glass section of the rear-view mirror, and through a plurality of monitor apertures positioned around a frame of the monitor module so as to align with the plurality of mirror apertures, each of the plurality of fasteners having been secured with a nut to fasten the monitor module to the rear side of the rear-view mirror. The method further includes removing the nuts from the plurality of fasteners thereby allowing the monitor module to be unfastened from the rear side of the rear-view mirror.

In still yet another exemplary embodiment, a method of enhanced viewing by a vehicle operator of areas within and/or exterior to a vehicle includes the sequential, non-sequential, and/or sequence-independent steps of: digitally capturing the first image by the first image capture device, the first image being displayable on the monitor module. The method further includes digitally transmitting the first image to the monitor module; and displaying the first image on the monitor module, wherein the first image is viewable through a see-through mirror glass section of the rear view mirror.

In some embodiments the first image is digitally transmitted to the monitor module in response to receiving a stop completed signal that indicates the vehicle has completed a stop and is preparing to resume a journey. In such embodiments the first image capture device is preferably mounted at a location that provides a view of an external side of the vehicle.

In yet another embodiment, the first image capture device is mounted at a location that provides a view of an external rear of the vehicle and the method further comprises, in response to receiving a backup signal indicating that the vehicle is preparing to backup, preventing display of a first image of the rear of the vehicle on the monitor module.

BRIEF DESCRIPTION OF THE DRAWINGS

The foregoing summary, including the above and other features and advantages of the herein described systems and methods, as well as a brief description of the preferred embodiments of the application will be better understood when read in conjunction with the appended drawings. For the purpose of illustrating the preferred embodiments of the present inventions, and to explain their operation, drawings of preferred embodiments and schematic illustrations are shown. It should be understood, however, that the application is not limited to the precise arrangements, variants, structures, features, embodiments, aspects, methods, advantages and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods, advantages, improvements and instrumentalities. In the drawings:

FIGS. 1a-b depict a general layout of a system in accordance with some embodiments of the invention.

FIG. 3 depicts an exploded view of a rear-view mirror and modular monitor assembly in accordance with some embodiments of the invention.

FIGS. 4a-e depict several views of a modular monitor in accordance with some embodiments of the invention.

FIGS. 5a-d depict several views of an example image capture device in accordance with some embodiments of the invention.

FIGS. 6a-d depict several views of a vehicle with a rear-view mirror and modular monitor system installed in accordance with some embodiments of the invention.

DETAILED DESCRIPTION OF PREFERRED EMBODIMENTS OF THE INVENTION

Figure 2B:
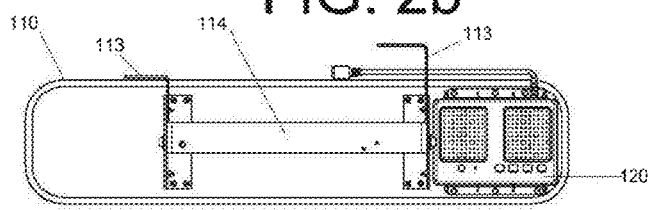
FIGS. 2a-d depict several views of a rear-view mirror and modular monitor assembly in accordance with some embodiments of the invention.

The following description includes many specific details, the inclusion of which is for the sole purpose of illustration and should not be understood to limit the invention in any way. Moreover, certain features which are known to those of ordinary skill in the art are not described in detail in order to avoid complication of the subject matter of the present invention. In addition, it will be understood that features in an exemplary embodiment may be combined with features in other exemplary embodiments of the invention without limitation.

It is to be understood that the invention is not limited in its application to the exemplary details of construction and to the arrangements of the components set forth in the following description of exemplary embodiments or illustrated in the drawings of exemplary embodiments. The invention is capable of other alternative embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used in or with other embodiments to yield a still further embodiment. Additionally, certain features may be interchanged with similar devices or features now known or later-developed that perform the same or similar functions. It is therefore intended that such modifications and variations are included within the totality of the present invention.

A multi-camera, rear-view mirror and modular monitor system includes a rear-view mirror that in some embodiments embeds a monitor behind, for example, see-through mirror glass. In some embodiments, the rear-view mirror and modular monitor system includes multiple cameras, some in the vehicle (e.g., a bus or truck, which are collectively referred to as a "bus"), as well as some cameras outside the bus, advantageously providing the driver or other individual an opportunity to view what is happening, for example, in the back rows of the bus and/or cabin, while also using the mirror to look at objects in the bus and/or cabin, and/or behind the bus, that are visible using the mirror. In some embodiments, a standard 6×30 mirror is advantageously used in the bus to view, for example, children that are behind the driver. In some embodiments, this standard 6×30 mirror is not needed for viewing traffic behind the bus, and in some embodiments it may be used to view objects other than vehicles both inside and outside the bus. In some embodiments other standard and/or custom sized rear-view mirrors may also be used.

In some embodiments, a standard rear-view mirror is used in combination with the dual-vision camera inventions described in U.S. application Ser. No. 12/608,600, filed Oct. 29, 2009, entitled "Method and System With Multiple Camera Units Installed in Protective Enclosure," which claims priority to U.S. application Ser. No. 61/109,763, filed Oct. 30, 2008 and 61/245,080, filed Sep. 23, 2009, and each of the above applications are incorporated herein by reference in their entirety.

In addition or alternatively, in some embodiments, any other suitable image capturing system is also contemplated for use either in conjunction with, or instead of, the dual-vision system. For example, any digital imaging device such as a digital camera and/or a digital video recorder may be used.

Advantageously, multiple cameras are provided in, for example, a bus or other truck or vehicle as well as some cameras outside the bus, providing the driver an opportunity to see what is happening in areas in and/or around the bus that cannot be seen in the rear-view mirror, while also using the rear-view mirror to look at passengers and objects that are visible through the mirror. In addition, in some embodiments, a monitor is either embedded behind see-through mirror glass, embedded in a cut-out aperture within the rear-view mirror, and/or otherwise attached to a portion of the rear-view mirror. In any event, the driver can view both the monitor and the rear-view mirror with relative ease and limited distraction to the driver.

In some embodiments, the interior cameras are located in the rear area of the cabin of the bus and face forward in the bus to show the driver what is happening behind the high-backs of the seats which cannot be seen when looking up at a conventional mirror. Alternatively or additionally, in some embodiments, cameras may be mounted in any suitable location to capture images which would otherwise be unviewable from the rear-view mirror. This may include ceiling mounted cameras, side wall mounted cameras, rear facing cameras, and the like.

In some embodiments, external cameras may be located anywhere around the outside of the bus that would provide views which can be helpful to the driver. As an example, the present assignee describes an exterior camera system layout and driver controls which affords a view substantially 360° around a school bus in U.S. patent application Ser. No. 13/177,302, entitled: "CAMERA SYSTEM FOR LARGE VEHICLES," filed Jul. 6, 2011, which is herein incorporated by reference in its entirety. The rear-view mirror and modular monitor system can advantageously display at least one selected imaging feed, and/or multiple imaging feeds simultaneously using standard monitor technology and/or multiple monitor modules connected to the rear view mirror. Additionally, corresponding audio for an area inside or external to the bus being displayed on the modular monitor may also be provided to the driver via the rear-view mirror and modular monitor system, which, in some embodiments, incorporates microphones built into the imaging devices and/or installed in the location of the imaging devices.

FIGS. 1a-b depict a general layout of a system for effectuating the present invention in accordance with some embodiments of the invention. In some embodiments, rear-view mirror and modular monitoring system 100 comprises, for example, at least three primary components: rear-view mirror unit 110, modular monitor 120, and imaging device 130. Modular monitor 120 and imaging device 130 are shown connected to each other via connection device 140.

In some embodiments, rear-view mirror unit 110 includes mirror 111 and at least one see-through mirror glass section 112, behind which modular monitor 120 is mounted for display. In some embodiments, mirror 111 may include a mirror cut-out aperture (not shown) in place of, or in addition to, see-through mirror glass section 112, behind which modular monitor 120 may be mounted for display. In yet other embodiments, modular monitor 120 may be mounted to any suitable portion of rear-view mirror unit 110 that provides sufficient viewing of modular monitor 120 and mirror 111.

In some embodiments, mirror 111 is a sheet of glass coated on the back side with black and chrome paint, making the front side reflective, similar to any standard rear-view mirror. As described herein, in some embodiments, a see-through mirror glass section may refer to a section of mirror 111 where the glass is coated with chrome paint only, or otherwise treated so as to make a standard see-through glass section 112 sufficiently transparent (when viewed from the front) when a strong enough light source, such as the light from an activated monitor display, is channeled through the back of the section, and is otherwise reflective (when viewed from the front side) when the light source is not provided or otherwise insufficient.

Figure 14A:
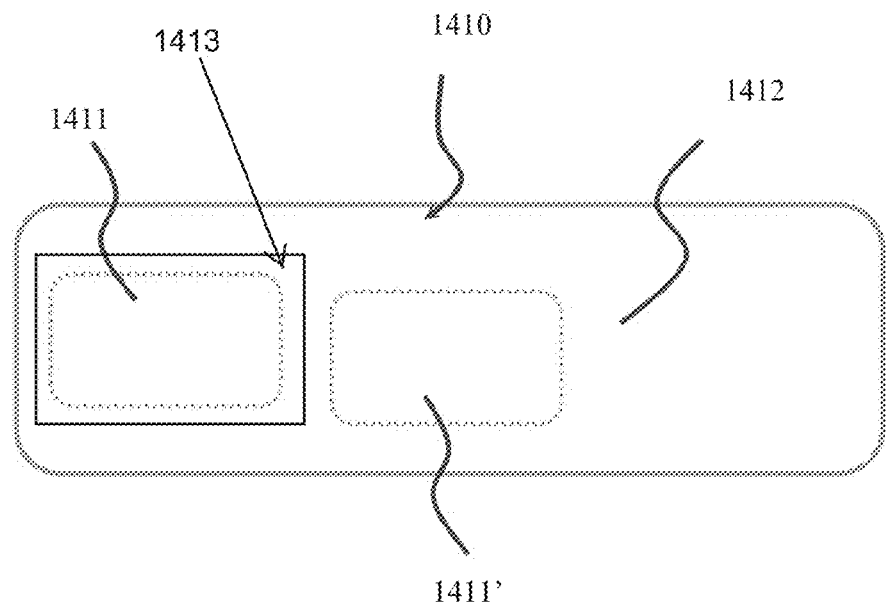
FIG. 14a depicts a schematic view of a rear-view mirror having two areas of different reflectivity in accordance with some embodiments of the invention.

In some embodiments, the rear-view mirror has a unitary reflecting surface of a single reflectivity or includes at least two areas of different reflectivity: a first area having a relatively low reflectivity, and a second area, such as the remaining area of the reflecting surface, having a higher reflectivity. For example, as illustrated in FIG. 14a, the first area 1411 can be on one side of a mirror 1410, and the second area 1412 can be the remaining area on the mirror 1410. In alternative embodiments, the first area can be located in the other positions within the mirror 1400, for example, in the middle of the mirror (1411'). As the first area is intended to cover an LCD monitor installed behind it, the placement and the size of the first area can be based on the size of the monitor screen and the monitor placement. More than one area of low reflectivity can be included as desired (e.g., if more than one monitor is used). The area of the higher reflectivity should be sufficiently large to ensure adequate reflectivity of the overall mirror. For example, the area of lower reflectivity can be about ⅙ to about ⅓ of the whole mirror area.

Figure 15A:
FIGS. 15a-15f are photos of rear-view mirrors having a monitor with an LCD screen in accordance with some embodiments of the invention, when the LCD is turned off (15a, 15c, 15e) and turned on (15b, 15d, 15f).
Figure 15B:
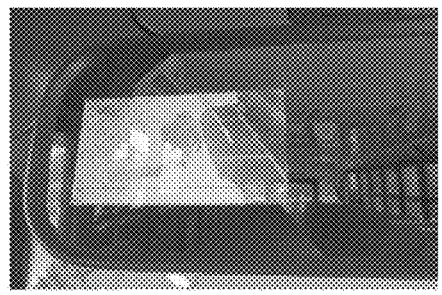

Such embodiments address an important problem for the design of an interior mirror which is intended to view the details of occupants of a vehicle, e.g., a school bus, where the interior mirror is used mainly to see details of, for example, students and/or children. As the interior of the school bus usually only has limited lighting, we have determined that it is desirable that the mirror has sufficient reflectivity. (By contrast, a standard interior mirror of passenger cars does not need to be as reflective because the mirror is used to see cars behind the vehicle which are visible either by their clearly defined daytime image or by their headlights at night.) However, when the mirror is used in conjunction with an LCD monitor as described in one or more embodiments of the present invention, the reflectivity should not be too high such that it would be difficult for the driver to see the images on the LCD monitor because of the glare on the mirror caused by the light from the surrounding environment (e.g., sunlight). In general, if the overall reflectivity of the mirror is, for example, in the 50-60% range, the whole mirror will be bright but not transmissive; when the reflectivity is, for example, below 20% (such as glass without a reflective, tinted or other type of coating, which has a reflectance of, for example, about 4% depending on the type of glass), the mirror is transmissive, and thus reflective images may appear too dark. A preferred reflectivity level for the mirror with single reflectivity (e.g., the reflectivity of the mirror in zone 1412 is substantially the same as that in zones 1411 and 1411' and the zone being within 5% reflectivity of each other or the zones being similar to each other and within 10% reflectivity of each other) would be between about 20% and 40%, alternatively between about 25% and 35%, more preferably and/or alternatively still about 30% (e.g., about a percentage reflects a 5% or less differential in reflectivity for a specific reflectivity value), so the mirror is sufficiently bright for a school bus with low interior lighting but transmissive enough to see the images of the LCD behind the glass. A mirror having a uniform low reflectivity is shown in FIG. 15a (when the monitor is off) and FIG. 15b (when the monitor is on). Although the low reflectivity helps the LCD screen of the monitor shine through the mirror, we have determined that the images in the mirror can be too dark for the driver to see the details inside of the bus. Nonetheless, in some embodiments, an additional tint may optionally be applied to either or both areas of the mirror. This tint may be provided to reduce unwanted glare, such as from solar reflection, headlights or the like. In some embodiments, the mirror may be tinted towards a specific color, such as yellow, by selectively preventing reflectance of unwanted wavelengths, such as blues and violets, so as to improve overall visibility. Tinting may also be provided to globally reduce the reflectance of all visible wavelengths by a predetermined amount, such as from 5% to 50%. Combinations may also be provided, so as to both reduce the reflectance of all wavelengths by a predetermined amount, such as 10% to 30%, while further suppressing, or even eliminating, the reflectance of other wavelengths, such as blues and violets. Any suitable optical filter or thin film may be used to provide such tinting.

In some embodiments with areas having different reflectivity, the higher reflectivity area can be made sufficiently high to ensure adequate light is reflected from the mirror to allow clear view of the target viewing area of the mirror, especially for low-light settings, such as the interior of a bus later in the day, or the like. Meanwhile, the reflectivity of the lower reflectivity area can be selected such that it has sufficient transmittance to allow the images on the monitor (when the monitor is on) to transmit through the mirror and overwhelm any glare coming from the sunlight or other light from outside and/or inside the bus so as to be viewable by the observer (e.g., a bus driver) under such lighting conditions. In this regard, in some embodiments, it is preferable to use a monitor that has high LCD brightness.

Figure 14B:
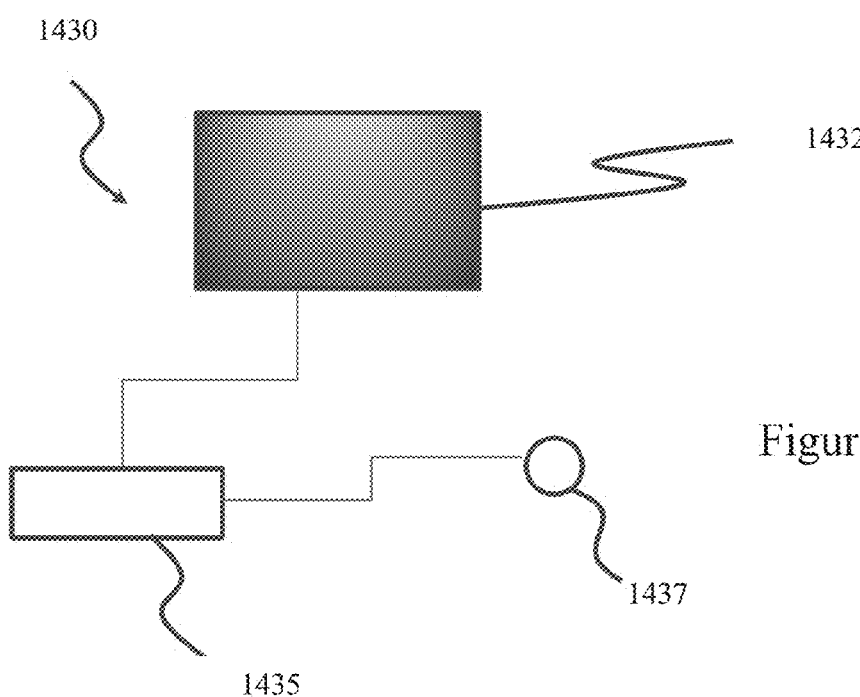
FIG. 14b depicts a schematic view of a monitor module having a light sensor and a control module suitable for use with a rear-view mirror in accordance with some embodiments of the invention.

In some embodiments, the monitor can have an LCD screen whose brightness can be manually adjusted, and/or automatically adjusted depending on the ambient light and/or glare coming from other light sources. As illustrated in FIG. 14b, in some embodiments, the monitor module 1430 includes at least an LCD screen 1432, a control module 1435, and a light sensor 1437. The light sensor (e.g., a photocell) can be mounted proximate the LCD screen and behind the first area of the mirror having low reflectivity, or mounted on the frame of the mirror, or other locations as preferred or desired. The light sensor 1437 can sense, for example, the ambient light level and generate a corresponding electric signal, and transmit the electric signal to the control module 1435, which can include a control circuit so that the signal received from the light sensor 1437 can be processed to generate a control signal to automatically adjust the brightness of the LCD screen 1432, such as by controlling the brightness of a backlight of the LCD screen 1432. In some embodiments, different brightness settings may be used and/or user selectable to allow automatic brightness control responsive to predefined user and/or monitor settings. In alternative embodiments, in addition to or instead of the automated control module 1435, a manual brightness switch is used to control the monitor brightness.

Figure 16:
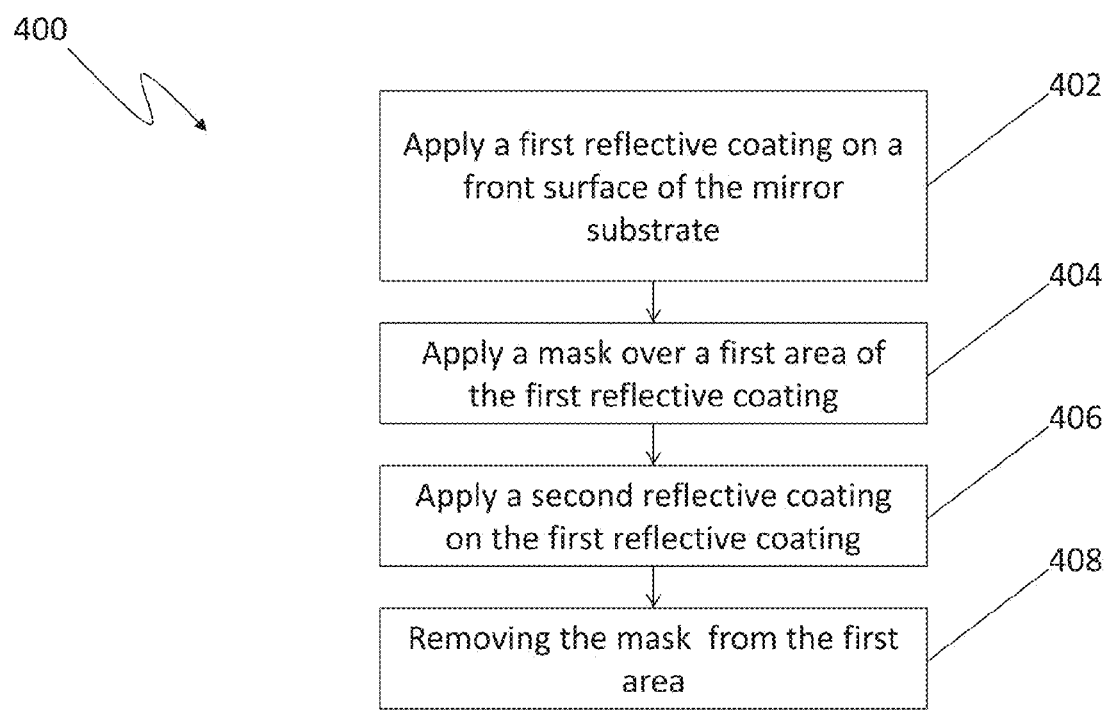
FIG. 16 is a flowchart of an embodiment method of applying a reflective coating to a rear-view mirror configured to accommodate a modular monitor system.

With reference to FIG. 16. to manufacture the mirror having the two areas of reflectivity, in some embodiments, the below exemplary process 400 can be used: (step 402) applying one or more reflective coatings of a first reflective material on the entirety of the mirror surface of a mirror substrate; (step 404) masking the first area where the low reflectivity is desired, and (step 406) applying a further coating of either the same reflective material, or a second, different reflective material to the area outside of the masked first area. Alternative methods can be used, for example, by applying a first reflective coating only on the first area and a second reflective coating only in the remaining area. Commonly known metal-based reflective materials and/or paints can be used, for example, chrome-based coating or paint. Multiple layers of coatings can be applied to the first area and/or the remaining mirror area as needed to obtain the desired reflectivity. In some embodiments, (step 408) the mask may be removed after one or more of the desired reflective coatings have been applied, and in particular after the final reflective coating in step 406 has been applied. In some embodiments, an opaque coating, such as black paint, may be applied before removal of the mask and thereafter the mask is optionally removed so that the first area is devoid of the opaque coating.

Figure 15C:
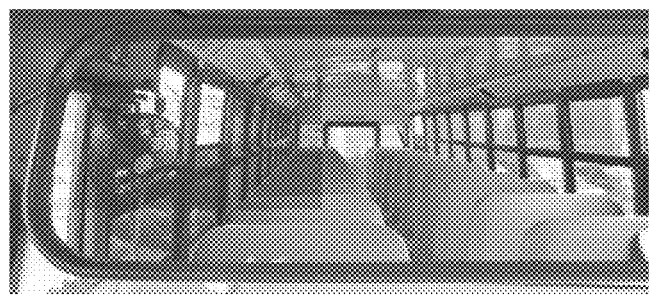
Figure 15D:
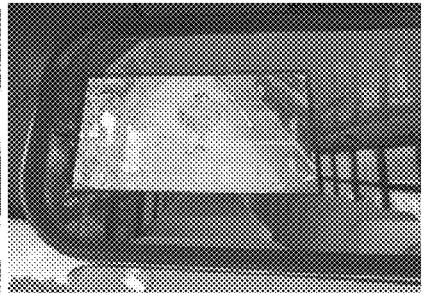
Figure 15E:
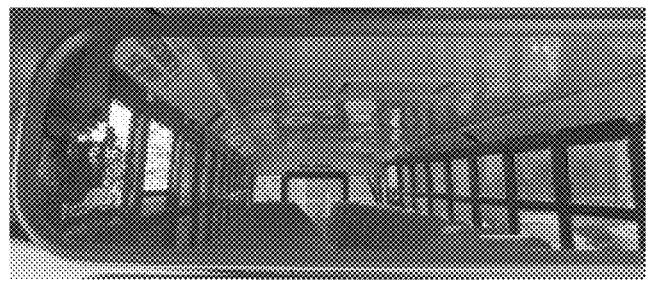
Figure 15F:

In some embodiments, the second area (having a higher reflectivity) can have a reflectivity in the 50-60% range, while the first area of relatively low reflectivity can have a reflectivity of 25% to 35%, or alternatively of about 20% or lower. Embodiments with a 20% reflectivity area are illustrated in FIG. 15c (when the monitor is turned off) and FIG. 15d (when the monitor is on). However, in such embodiments, because of the high contrast of reflectivity between the two areas, the difference between the two areas can be visible when the monitor is off, as shown in FIG. 15c, (where the first area is visible as a darker area embedded in a brighter area). This can cause discomfort or annoyance to the driver. In preferred embodiments, the reflectivity of the first area and the second area can be selected such that the difference in reflectivity between the first area and the other parts of the mirror is not visible or perceivable under normal operating conditions (when the monitor is off), as shown in FIG. 15e (FIG. 15f shows such a mirror when the monitor is turned on). For example, the reflectivity of the first area 1411 can be selected to be about two-thirds of the reflectivity of the higher reflectivity area 1412 (e.g., the remaining mirror area), e.g., the reflectivity of the first area 1411 can be selected to be about 30%, and the reflectivity of the second area 1412 can be selected to be about 45%. High brightness LCD monitors can be particularly useful in such embodiments to overcome the not-too-low reflectivity of the first area 1411, e.g., those have or can be adjusted to have a brightness of 1,000-1,2000 candelas per square meter. Other values of reflectivity in the two areas (and/or the contrast ratio of the reflectivity between the two areas) can be selected based on different applications, parts of the country, positions of the mirror within the bus, etc. In yet other embodiments, the reflectivity of both the first area 1411 and the second area 1412 can be substantially the same or similar to each other, such as between 20% and 40%, between 25% and 35%, and/or around 25% or 30%. Masking may or may not be employed is such embodiments. In some embodiments, second area 1412 may have an opaque backing while first area 1411 does not.

In some embodiments, as shown in FIG. 14a, a transition region 1413 may be disposed between the first area 1411 and the second area 1412, in which the transition region 1413 has an intermediate reflectivity that is between the respective reflectivities of the first area 1411 and the second area 1412. In preferred embodiments, the transition region 1413 has a plurality of successively increasing reflectivities from the first area 1411 to the second area 1412, so that the reflectivity of the mirror 1410 steadily increases in stepwise fashion from the first area 1411 to the second area 1412 within the transition region 1413. It will be appreciated that, with a suitable number of steps and/or application of reflective material, the reflectivity of the transition region 1413 can be made to appear to smoothly increase from a minimum value that is substantially the same as the reflectivity of the first area 1411, and which abuts the first area 1411, to a maximum value that is substantially the same as the reflectivity of the second area 1412 and which abuts the second area 1412. In one specific embodiment, the first reflectivity of the first area 1411 and second reflectivity of the second area 1412 are substantially similar to each other (e.g., within 5-10% of each other), and the reflectivity of the transition region 1413 serves to provide a smooth or stepped blending between the first and second reflectivities.

In some embodiments, and referring back to FIGS. 1a and 1b, rear-view mirror unit 110 includes mirror unit mounting brackets 113. The configuration of mirror unit mounting brackets 113 is merely exemplary, and any suitable configuration which provides proper mounting support for rear-view mirror unit 110 in a vehicle is likewise contemplated. Additionally or alternatively, in some embodiments, rear-view mirror unit 110 may be provided with a standard locking mechanism, as described in further detail in the description of FIG. 7, to lock rear-view mirror unit 110 in place.

In some embodiments, image capture device 130 is a standard digital still and/or video camera. In some embodiments, image capture device 130 also includes Infrared (IR) Light Emitting Diode (LED) lighting (or equivalent IR lighting) for capturing images in low or no visibility without requiring a flash or other bright light source. In some embodiments, a standard light source may be provided in addition to or in place of IR LED lighting. While image capture device 130 is shown here with a wired connection to modular monitor 120, in some embodiments image capture device 130 may be a wireless device, which is controlled and transmits captured images wirelessly via a wireless transmission such as Wi-Fi, Bluetooth, IR, cellular etc. Furthermore, while image capture device 130 is shown here as a stationary camera, in some embodiments image capture device 130 may be a standard motorized, multi-directional manually/automatically controlled camera, which may provide the operator with additional views inside and/or outside the bus. In some embodiments, image capture device 130 is powered by at least one of the vehicle's internal power source, and a stand-alone power source such as a rechargeable camera battery or a solar cell.

In some embodiments, connection device 140 comprises one or a plurality of input feeds 141. In some embodiments, the input feeds 141 are standard video input feeds, which can be connected to any number and combination of devices. For example, input feeds 141 may be respectively connected to multiple image capture devices 130 and/or a combination of image capture devices 130, audio capture devices (not shown), e.g., a microphone, and/or other sensors, e.g., a photocell light sensor, as desired. In some embodiments, connection device 140 further comprises a power feed 142 for providing power to modular monitor 120 from a power source (not shown), e.g., the vehicle battery, and a line out feed 143, for connecting modular monitor 120 to an output device such as, for example, a stand-alone speaker (not shown) or additional monitor (not shown).

In some embodiments, connection device 140 includes monitor video feed 144, to provide at least one a digital image, an audio signal, sensor data, and power to the monitor 120, and to provide output from the modular monitor 120 to an output device. It will be readily understood by those of ordinary skill in the art that, while in the embodiments described herein, connection device 140 is shown as one comprehensive configuration, other embodiments providing for multiple separate standard connection devices and/or other configurations employing standard connection devices and/or wireless connections may also be used.

Figure 2C:
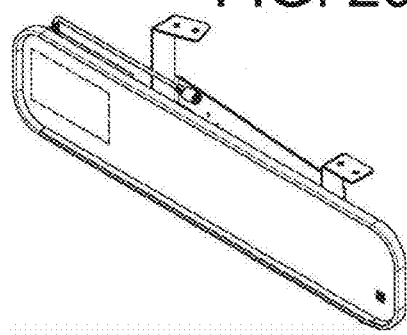
Figure 2A:

FIGS. 2a-d depict several views of a rear-view mirror and modular monitor assembly in accordance with some embodiments of the invention. In particular FIG. 2a depicts a front view of rear-view mirror unit 110 and see-through mirror glass section 112, the exemplary location of which is depicted by a hash-lined rectangle. It will again be readily understood by those of ordinary skill in the art that, while in the embodiments described herein, see-through mirror glass section 112 is depicted as being rectangular in shape, any other shape suitable for commensurate with the shape of a monitor display to be attached thereto is also contemplated. Additionally, as explained above, while the hash-lined rectangle is described as indicating the general location of see-through mirror glass section 112, in some embodiments, the hash-lined rectangle indicates the general location of a mirror cut-out aperture (not shown) in place of, or in addition to, see-through mirror glass section 112, behind which modular monitor 120 may be mounted for display. In yet other embodiments, modular monitor 120 may be mounted to any suitable portion of rear-view mirror unit 110 that provides sufficient viewing of modular monitor 120 and mirror 111, without necessitating see-through mirror glass section 112 or a mirror cut-out aperture. In yet other embodiments, the rear-view mirror may include an additional section, slot or receptacle, optionally molded, within and/or integrated with the housing to accommodate the monitor for connection and facilitate easy removal therefrom.

FIG. 2b depicts a back view of the exemplary rear-view mirror unit 110 of FIG. 2a, with modular monitor 120 fastened to the back, adjacent to the reverse (back) side of the location of see-through mirror glass section 112. It will again be readily understood by those of ordinary skill in the art that, while in the embodiments described herein, see-through mirror glass section 112 and modular monitor 120 are shown located to one side of rear-view mirror unit 110, this is merely exemplary, and other locations along mirror 111 are also contemplated. In addition to depicting mirror unit mounting brackets 113, FIG. 2b also depicts fixed mounting bracket 114, which is discussed in greater detail in the description of FIG. 7 below. Other embodiments include fewer or more brackets, and other configurations as necessary to secure rear-view mirror unit 110 in place. It should also be noted that, while the embodiments described herein depict rear-view mirror unit 110 as being fastened to an internal portion of a vehicle, alternative embodiments wherein rear-view mirror unit 110 is mounting to an external portion of a vehicle are also provided.

Figure 2D:
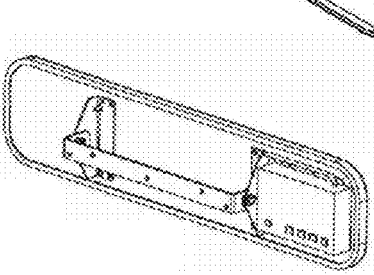

FIGS. 2c-d depict several alternative views of rear-view mirror unit 110 and modular monitor 120 in accordance with some embodiments.

FIG. 3 depicts an exploded view of a rear-view mirror and modular monitor assembly in accordance with some embodiments of the invention. In particular, FIG. 3 shows how modular monitor 120 may be fastened to rear-view mirror unit 110, and how rear-view mirror unit 110 may be assembled, in accordance with some embodiments of the invention.

In accordance with some embodiments, modular monitor 120 may be fastened to rear-view mirror unit 110 with the use of self-clinching threaded pin fasteners, such as monitor fasteners 118, and monitor nuts 119 for securing monitor fasteners 118 in place. Other types of fasteners may alternatively be used as well, such as screws, adhesives, snap fit, adhesive tape, velcro and the like. In some embodiments, modular monitor 120 may be fastened directly to mirror unit backing 116 by threading monitor fasteners 118 through mirror unit backing apertures 165 located around the perimeter of backing cut-out 172, and through modular monitor apertures 127, which are located along the perimeter of monitor frame 126, and securing monitor fasteners 118 in place with monitor nuts 119.

However, in other embodiments, modular monitor 120 is fastened to mirror unit backing 116 with monitor gasket 117 disposed therebetween. Monitor gasket 117 optionally includes gasket apertures 129. In some embodiments, monitor fasteners 118 are threaded first through mirror unit backing apertures 165, then through gasket apertures 129, and finally through modular monitor apertures 127, after which they are secured with monitor nuts 119.

In some embodiments, monitor gasket 117 advantageously serves to block external light from disturbing an image displayed on modular monitor 120 by reaching monitor display 121 from between modular monitor 120 and the reverse side of see-through mirror glass section 112. Monitor gasket 117 also serves to channel the light (image) emitted by monitor display 121 through the reverse side of see-through mirror glass section 112, as well as to protect monitor display 121 from any incidental rubbing or scratching against mirror unit backing 116. In some embodiments, monitor gasket 117 is configured and shaped to follow the perimeter of monitor display 121.

As shown in FIG. 3, in some embodiments, rear-view mirror unit 110 is further assembled by inserting mirror 111 into mirror unit backing 116 and affixing mirror 111 in place using mirror frame 115. In some embodiments, mirror frame 115 is fastened to mirror unit backing 116 by way of additional fasteners. In other embodiments, mirror frame 115 is shaped and configured so as to become affixed to mirror unite backing 116 when a sufficient force is applied to mirror frame 115, so that at least a portion of mirror frame 115 is held in place over mirror unit backing 116, such as, for example, by employing the use of a lip, indentation, or groove (not shown) to which mirror frame 115 can attach. Other methods of attachment are of course also contemplated, such by use of an adhesive or bond. Additionally, the back of mirror 111 and/or the internal surface of backing 116, may be coated with a pressure-sensitive adhesive or the like to better couple mirror 111 to backing 116. In certain embodiments, the pressure sensitive tape or adhesive that is added to the back of the mirror glass 111 is selected to make the glass shatter-proof or shatter-resistant.

In some embodiments, assembly of rear-view mirror unit 110 may be completed by affixing fixed mounting bracket 114 to mirror unit backing 116. In some embodiments, fixed mounting bracket 114 is connected to L-brackets 152 and 153 using fastener 166, washers 167, and nuts 168. L-brackets 152 and 153 are connected to mirror unit backing 116, for example, by inserting fasteners 169 through L-bracket apertures 170 and affixing them to backing bracket apertures 171.

While the above description of FIG. 3 provides an example embodiment of an assembly of rear-view mirror unit 110 and modular monitor 120, those of ordinary skill in the art will readily recognize that many features of the above descriptions are exemplary in nature. For example, in place of a fastener, an adhesive or bond might be employed.

FIGS. 4*a-e* depict several views of a modular monitor in accordance with some embodiments of the invention. FIG. 4*a* depicts a front view of modular monitor 120 in accordance with some embodiments. As can be seen in FIG. 4*a*, modular monitor 120 includes monitor display 121 on a front face of the monitor. In some embodiments monitor display 121 is an LCD monitor. However, other display types are also contemplated, such as LED monitors, OLED monitors, etc. In some embodiments, monitor display 121 provides strong enough light levels so that images displayed on monitor display 121 will be clearly visible through see-through mirror glass section 112. In alternative embodiments when a mirror cut-out aperture is used in place of see-through mirror glass section 112, a relatively weaker display may be sufficient for proper visibility of the images.

FIG. 4*b* depicts a back view of modular monitor 120 in accordance with some embodiments. As can be seen in FIG. 4*b*, modular monitor 120 includes monitor speakers 122 on a rear face of the monitor. Of course, in other embodiments, monitor speakers 122 may be located on another side of modular monitor 120. In yet other embodiments, no speakers are integrated into modular monitor 120, as can be seen, for example, in FIG. 2*d*. In some embodiments, an output port is provided in addition to, or in place of, monitor speakers 122, to provide audio output to external audio devices such as an external speaker, wired headsets, and/or wireless headsets.

In some embodiments, manual controls 123 are provided on modular monitor 120. In some embodiments, manual controls 123 control power, volume, input selection, settings for automatic use, and/or other settings. In some embodiments, modular monitor 120 includes sensor 124 and indicator light 125. In some embodiments, sensor 124 may be a photocell light sensor, which detects levels of ambient light in the area around modular monitor 120, and can adjust the brightness of monitor display 121 to compensate for excess and/or insufficient light. Indicator light 125 may be configured to indicate, for example, that modular monitor 120 is powered on or off, and/or operating correctly.

In some embodiments, modular monitor 120 may have built-in and/or removable memory (not shown) for recording images and/or audio.

FIGS. 4*c-e* depict additional views of modular monitor 120 in accordance with the invention.

FIGS. 5*a-d* depict several views of an example image capture device 130 in accordance with some embodiments of the invention. As explained above, in some embodiments, image capture device 130 may be for example, a standard digital still and/or video camera, an IR/LED camera or the like. Additionally, in some embodiments, image capture device 130 may further comprise a built-in audio capture device (microphone). Furthermore, though image capture device 130 is shown with a wired connection device, a partially or completely wireless image capture device is also contemplated. Likewise, in some embodiments, image capture device 130 may be powered by the vehicle, and/or may have an internal battery.

FIGS. 6*a-d* depict several views of a vehicle with a rear-view mirror and modular monitor system installed in accordance with some embodiments of the invention. In some embodiments, as illustrated in FIG. 6*a* seen from behind the driver, when the bus is in reverse, monitor display 121 can be configured to always show camera 3 view (back-up) as shown in FIG. 6*d*. When not in reverse, the driver can then manually choose video inputs from cameras 1, 2, or 3 (exemplary locations of which are depicted in FIG. 6*d*) from video input switch 180 by way of respective switches 181, 182, 183, or choose no view at all (full mirror view).

In alternative embodiments, as illustrated in FIG. 6*b* seen from behind the driver, when the vehicle is in reverse, monitor display 121 can be configured to always show camera 3 view (back-up). When not in reverse, the driver can use video input switch 180, located on dashboard 185, to choose a single-feed configuration providing a video input from either camera 1 or camera 2, a multiple-feed configuration providing a split video input of cameras 1 and 2, input from camera 3, or no view at all (full mirror view).

In additional alternative embodiments, the selection of the view for the monitors can be based on driver preference using a standard input switch mechanism, manually or manually activated. For example, when not in reverse mode, the driver might still want camera 3 providing input to the monitor as part of the multiple-feed split video configuration.

FIG. 6*c* depicts a view from above of an exemplary location of rear-view mirror unit 110 and video input switch 180 relative to the driver. FIG. 6*d* provides exemplary mounting locations for cameras within and external to the bus.

In some embodiments, the video switch 180 or other existing or additional switch can be configured to select one or more video feeds from one or more cameras based upon one or more optional triggering signals. In some embodiments, a first triggering signal comprises a backup signal that indicates that the vehicle has been placed in reverse and/or is ready to move in reverse. Any suitable method may be used to obtain such a signal, such as by using the backup lights, a signal from the transmission, drive selector moved to reverse, or the like. A second optional triggering signal comprises a stop-completed signal, indicating that the vehicle has completed a stop and is preparing to move forward in continuance of its journey. Any specific method may be used to obtain such a signal. With specific reference to busses, the stop completed signal can be obtained, for example, from monitoring when the door has been closed; that is, the closing of the passenger door can be interpreted as a stop completed signal, which can be used by the video switch 180. In a school bus, for example, the stop completed signal can be optionally obtained by monitoring the flashing lights that are displayed when a school bus has stopped and/or other shifting of the bus into forward or reverse gear, and the like. In some embodiments, when the flashing lights cease flashing (e.g., are turned off) or the gears have changed or moved from parked to forward or reverse, this event can be interpreted as a stop completed signal.

In busses, and for school busses in particular, it is very desirable to have an external view of one or more the sides of the bus as the vehicle pulls away from a stop, as individuals that are in close proximity to a bus when the vehicle pulls away may be inadvertently struck by the vehicle. To provide a driver with ample opportunity to review the sides of or around the bus for hazard conditions, in one embodiment the video input switch 180 is configured to monitor the stop completed signal and to selected a video feed from an external camera for display in monitor display 121 for a predetermined amount of time after receiving the stop completed signal, such as for 5 to 15 seconds, more preferably about 10 seconds. In some embodiments, the selected video feed is from one or more cameras that monitors a side(s), front or rear of the bus. For example, with reference to FIG. 6*d*, upon receiving the stop completed signal, such as when the bus doors close and/or the flashing warning lights are turned off, the video switch 180 selects a video feed from camera 2 and causes this feed to be presented on display 121 for 10 seconds; alternatively, a split-view scene could be presented in display 121 formed by the video splitter 180 by a combination of the video feeds from both cameras 1 and 2 so that both the left and right sides of the bus are presented in a single view 121.

Although backup cameras are highly desirable when backing up a vehicle, in some situations their use may be discouraged in favor of side view and/or rear view mirrors. Hence, in some embodiments, upon receiving the backup signal, the video switch 180 may temporarily disable the video feed for the backup camera 3 for a predetermined amount of time, such as 30 seconds to two minutes, more preferably for about one minute, and instead require the driver to use the external mirrors instead of relying on a monitor in the interior of the bus. After this predetermined amount of time has elapsed the video, switch 180 may then cause the video feed from the backup camera 3 to be presented in the display 121, assuming that the bus is still in reverse as indicated by the backup signal or if such as display is manually requested, such as by a switch 183.

Figure 7:
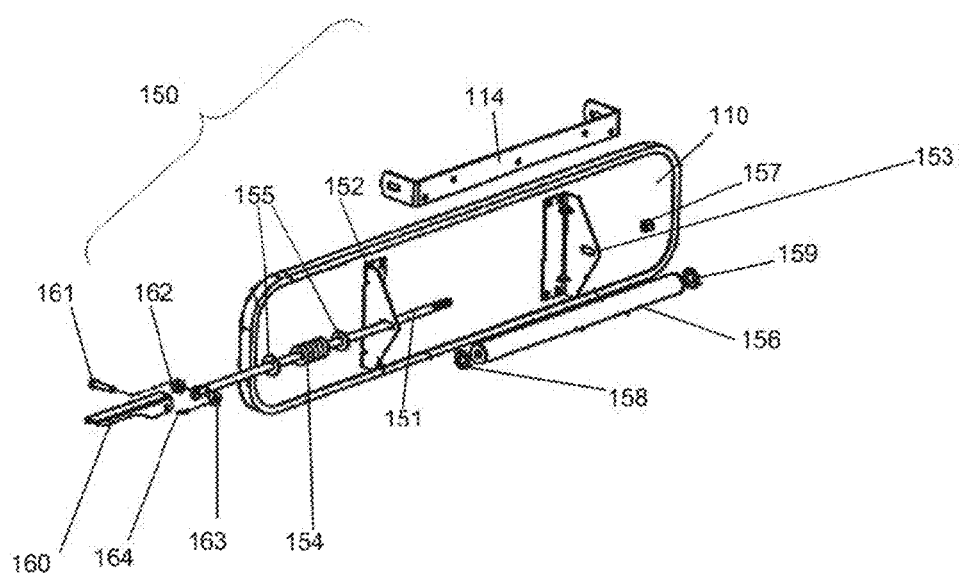
FIG. 7 depicts parts of an optional lever lock mechanism which can be used to lock a rear-view mirror and modular monitor assembly in place in accordance with some embodiments of the invention.

FIG. 7 depicts an optional lever lock mechanism which can be used to lock a rear-view mirror and modular monitor assembly in place in accordance with some embodiments of the invention. In some embodiments, an optional lever lock mechanism can be used to lock rear-view mirror unit 110 in place in the vehicle as currently offered by Rosco, Inc. of Jamaica, N.Y. and the assignee of the present application. According to some embodiments, FIG. 7 depicts parts of the rear-view mirror unit's locking mechanism 150, including the fixed mounting bracket 114 attached to the vehicle and the shaft with a threaded end 151 that is passed through or positioned in L-brackets 152 and 153.

A helical compression spring 154 is slid onto shaft 151 and flat washers 155 are positioned on either end of helical compression spring 154. Also, tubular sleeve 156 is positioned around shaft 151 between L-bracket 152 and L-bracket 153. Shaft 151 is secured into place using lock nut 157 on the outside of L-bracket 153 (on the side of the L-bracket 153 facing away from L-bracket 152). Also, lock washer 158 and lock washer 159 may be positioned on either side of tubular sleeve 156 between L-bracket 152 and L-bracket 153. Shaft 151 is also passed through both sides of fixed mounting bracket 114. That is, one end of fixed mounting bracket 114 may be positioned between tubular sleeve 156 and L-bracket 152 and the other end of fixed mounting bracket 114 may be positioned between the other end of tubular sleeve 156 and L-bracket 153.

Handle 160 may be positioned on an end of shaft 151 and secured thereto using clevis pin 161 and spacer 162 and spacer 163 on either end of clevis pin 161. Also, cotter pin 164 may be positioned on an end of clevis pin 161 to secure it in place inside handle 160. It will be understood that, while particular components of locking mechanism 150 are described herein, various parts may be omitted, or may be combined and formed integrally, or the parts may be arranged in different ways without departing from the spirit of the present disclosure. For example, while helical compression spring 154 is described, it will be appreciated that other types of springs or non-spring urging members may be used to apply pressure to L-bracket 152 as described below; or, while mounting bracket 114 is described as being attached to the bus, other types of fasteners may be used to secure rear-view mirror unit 110 or locking mechanism 150 to the vehicle.

Figure 8A:
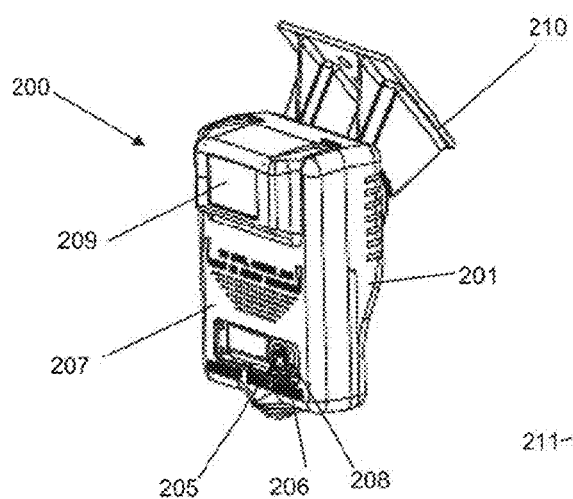
FIGS. 8a-b depict several views of a dual-vision camera system which may be used in conjunction with a rear-view mirror and modular monitor system in accordance with some embodiments of the invention.
Figure 8B:
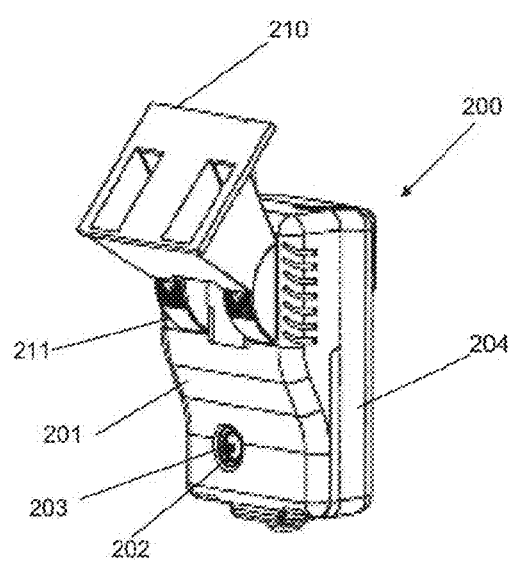

FIGS. 8*a*-*b* depict several views of a dual-vision camera system which may be used in conjunction with a rear-view mirror and modular monitor system in accordance with some embodiments of the invention.

In some embodiments, a dual-vision camera system can be used in place of, or in conjunction with image capture device 130 to provide images and/or audio to modular monitor 120. The illustrative camera system, disclosed in incorporated by reference U.S. patent application Ser. No. 12/608,600 cited above, records images of both the interior and exterior of a vehicle. Specifically, the camera system provides for recording the interior and exterior of a vehicle on a continuous loop, with the oldest data erased by more recent video, and will save sequences of video and audio recordings based upon certain predetermined recording events.

The dual-vision system 200 of FIGS. 8*a* and 8*b* includes in at least one embodiment two cameras within the same housing: one camera captures video of the interior of the vehicle, while the second camera captures video of vehicles, pedestrians, road signs, traffic lights, etc. in front of the vehicle. In alternative embodiments, the dual-vision system 200 is provided with a microphone to record audio within the interior of the vehicle. In alternative embodiments, different numbers of cameras can be used with different field of views, from a single camera to a number of different cameras. One advantage of the camera system is that it allows the recording of the video of the driver and/or passengers of the vehicle in addition to video of the outside of the vehicle to allow review of events, such as distractions to the driver within the vehicle, car accidents, near-accidents, etc.

For example, according to one embodiment, the camera system records images from both a camera pointed in the direction of travel of the vehicle as well as a camera pointed towards the interior of the vehicle. In some embodiments, the cameras capture images at regular intervals, for example, one frame every second or every other second, whereas in other embodiments, the cameras capture motion video at 15 frames per second, 24 frames per second or 30 frames per second. In alternative embodiments, the camera system stores video in a continuous loop on a memory or other standard data storage device, for example, a standard SD card. As will be understood, other types of standard memory devices such as hard drives, data storage, tape drives, etc. are contemplated by the camera system. In alternative embodiments, the memory card, e.g., SD card and the like, for the recording device is removable. The memory card may be lockable to prevent theft or tampering with the data.

Video will continue to be captured, overwriting non-protected portions of the memory until a recording event occurs such as the driver activating a panic button, a g-force measured beyond a certain threshold by an accelerometer in 3-axis, a g-force measured beyond a certain threshold by an accelerometer in 2 axis, a sufficient bump is measured by an accelerometer, excessive brake is measured by an accelerometer or other device connected to the vehicle braking system, speed exceeds a certain predetermined threshold, and the like. Audio and/or video captured in response to a recording event is stored for later review and will not be overwritten by continuous loop recording until indicated by an individual with sufficient permissions, e.g., transportation manager. Captured video and/or audio recorded in response to a recording event, in alternative embodiments, is recorded on a separate part of the memory card or alternatively a separate memory that cannot be over-written except by someone with additional permissions, e.g., transportation manager. In some embodiments, video and/or audio captured before and/or after the event is stored in a separate memory or protected area of the memory or marked as non-erasable to prevent its erasure. In some embodiments, the type of recording event, e.g., braking event, collision, etc., is stored along with the audio and/or video of the recording event to allow sorting of recordings at a later time.

In certain embodiments, the dual-vision system 200 is provided with a built-in standard GPS sensor, which can determine the location, speed and direction of the vehicle. In certain embodiments, the GPS location of the vehicle is recorded along with the audio and/or video recorded in a continuous loop. In other embodiments, the GPS location is recorded only when a recording event occurs. In alternative embodiments, the dual camera system unit 200 can optionally connect directly to the windshield or other location of the vehicle directly without the need of an additional enclosure. For example, the slots/grooves on either the front or back side can be used to connect/slide into any standard mounting unit for connection to the vehicle.

In alternative embodiments, an event counter is beneficially provided that counts by each type of recording event in the aggregate and/or separate counter for each type of event. The counter includes or is connected to a display that displays either always or by request/actuation of a switch that optionally is only accessible to the manager for efficient determination whether the actual recording events should be viewed by, e.g., the manager.

In alternative embodiments, an audible chime is included that makes an audible sound and/or light indicator that illuminates if the vehicle/driver exceeds predetermined speed and/or for predetermined recording events such as excessive braking, and the like.

In alternative embodiments, a delay timer is included which allows the device to continue to capture video for a predetermined time after the ignition is turned off. Alternatively, the system captures still frames at regular intervals (e.g. 15 or 30 sec) to see if anyone is in and/or around the vehicle and/or captures video and/or still images when the ignition is off and a motion detector is triggered to prevent theft and/or record events in the vicinity of the vehicle.

In alternative embodiments, when forward and backward cameras are used, either two separate cameras are provided on opposite sides of a mirror, such as a rearview mirror, one camera pointing forward and another pointing backward. In other embodiments, a single structure having two cameras integrated therein, one pointing forward and the second pointing backward as described herein may be used.

According to one embodiment of the invention, the camera system is provided with a housing containing two cameras, where each camera is directed in opposite directions to capture images in the interior of a vehicle and exterior of a vehicle. For example, referring to FIGS. 8a and 8b, one embodiment of the camera system is depicted. A dual-vision system 200 is shown, where a front housing 201 contains a first camera opening 202 that allows a first camera 203 to be directed to the front of the vehicle when dual-vision system 200 is mounted, for example, within a vehicle. A back housing 207 contains a second camera opening 205 that allows a second camera 206 to be directed to the interior of the vehicle when the dual-vision system 200 is mounted within a vehicle. Either or both of first camera 203 and second camera 206 may be wide-angle, fixed focal length and/or zoom to allow various views from the cameras. Back housing 207 may optionally contain a microphone opening 208 to enable recording audio within the vehicle during operation. Front housing 201 and back housing 207 may be composed of any suitable material such as, for example, plastic, resin, metal, etc. In alternative embodiments, the housing may be connected to the exterior of the vehicle and/or may be used for other applications besides connection to the vehicle.

A light source 209 is provided that illuminates the interior of the vehicle during low lighting situations. In some embodiments, light source 209 is a replaceable standard infrared LED light source or other standard light source. Light source 209 can be provided with a clear protective lens, which is easily replaceable, and can protect expensive optical elements that could be vandalized. According to some embodiments, the light source 209 automatically illuminates vehicle interior in low light conditions. Light source 209 may alternatively provide illumination in a visible range, infrared range or both. The light source 209 can be compact and attachable without hardware, or it may have a low profile, with fasteners required for assembly. In embodiments wherein light source 209 provides illumination in an infrared range, second camera 206 is supplied with at least one image sensor capable of sensing light in the infrared range.

Mount 210 is optionally provided that connects dual-vision system 200 to a windshield, ceiling, mirror or dashboard. The housing attaches to the windshield/ceiling mount via tooth mesh (similar to gears, except there is no rotation permitted when the securing screw is tightened). The housing mount can be adjusted in reference to the mount by way of mount hinge 211 so that it always is in a vertical and/or predetermined position. The disclosed camera system provides significant advantages of recording, while not degrading the (sometimes) limited amount of open space available for the driver to maintain maximum visibility through the windshield.

Figure 9:
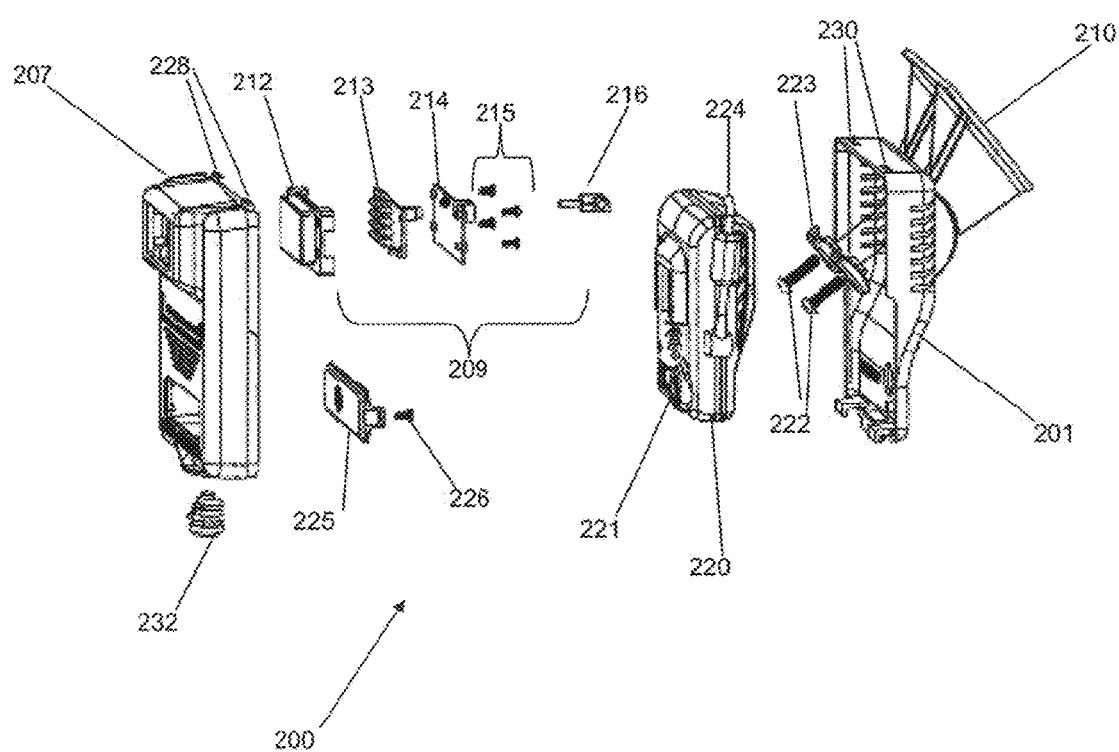
FIG. 9 depicts an exploded view of a dual-vision camera system in accordance with some embodiments of the invention.

Referring to FIG. 9, an exploded view of a dual-vision camera system 200 according to some embodiments of the invention is depicted. Light source 209 is comprised of clear LED protective lens 212, LED circuit board 213, LED backplate 214, one or more screws 215 and LED power jack 216. In some embodiments, protective lens 212 contains a filter to provide illumination in other light ranges such as, for example, infrared. In operation, LED circuit board may provide illumination in various light ranges such as, visible or infrared. Power jack 216 may be connected to an independent power source or may share a power source with other components of system 200. Light source 209 can be a preassembled component that snaps into housing back 207 or is received by an indent in housing back 207. In other embodiments, light source 209 is fixed to housing back 207 by screws or rivets. In alternative embodiments, the light source may be integrated with one or more of the cameras, may be separately mounted to the housing and/or may include a plurality of different types of light sources directed in any number of directions.

Camera unit 220 contains first camera (not shown) and second camera 221. In various embodiments, camera unit 220 is provided with at least one microphone for recording audio in addition to the outputs of the camera. Camera unit 220 may advantageously be affixed, via for example, being snapped into one or both of housing back 207 and housing front 201, or may be received by an indent in one or both of housing back 207 and housing front 201. In other embodiments, camera unit 220 is fixed to one or both of housing back 207 and housing front 201 by screws or rivets. Camera unit 220 is provided with power through power cable 224 and an optional light source. In some embodiments, camera unit may be connected to an independent power source, may include its own power source and/or may share a power source with other components of system 200. According to one advantage of the present invention, camera unit 220 is portable and a self-contained unit that may be advantageously be removed from the housing to protect the camera unit, light source and/or memory from theft, tampering and/or vandalism. In other embodiments, camera unit 220 and light source 209 may be advantageously removed from the housing together to provide portability and protection of the cameras, memory, processor, recording unit and/or LED circuit board 213.

Camera unit 220 of the present invention in at least one embodiment is connected to the vehicle's ignition system to receive power. In accordance with this embodiment, the camera unit(s) will only start when ignition is turned on. In some embodiments, the camera unit(s) stops capturing audio/video after a preset (user determined) interval or immediately after ignition is turned off. In other embodiments, power to the dual-camera system is provided through a cigarette lighter cord, standard 120V or 240V power cord, USB cord, or the like. In other embodiments, the dual-camera system is hardwired into the electrical system of the vehicle.

In other embodiments, a rechargeable battery powers the system 200 and camera unit 220. Camera unit 220 optionally operates (on battery power) even when it is not cradled in the housing, in case the driver needs to capture audio/video outside the camera's normal field of vision (e.g., vehicle body damage after a collision). Alternative power mechanisms and/or battery backup mechanisms may be used, and alternative procedures for starting and stopping recording of audio and/or video may be utilized.

Additionally, camera unit 220 is provided with means for recording the output of the cameras. For example, in some embodiments unit 220 is provided with an internal hard drive, data storage device and/or other standard memory device to record the outputs of the cameras and optional microphone. In various embodiments, the outputs of the cameras and optional microphone are recorded instead of the fixed memory device and/or in addition to the fixed memory storage device, on removable media such as, for example, SD memory. In one embodiment, each of the first and second cameras are connected via 16-bit connection to a circuit board, and a memory device such as an SD card. Direct connection enables the memory to receive the video and audio signals in their original digital format, and store it as such. As will be understood, the memory device may be removed from the housing to allow the contents of the memory to be reviewed at another location. Further, the portability of the memory device protects it from theft and vandalism An adjustment mechanism is provided that allows the angle of the housing to be changed relative to the surface to which the system 200 is mounted. Screws 222 are used to connect housing front 201 to mount 210. Pressure bushings 223 are provided such that sufficient clamping force is used to prevent housing front 201 from loosening from the mount 210. Mount 210 may be adjusted to change the angle of the dual-vision system 200 with respect to, for example, windshields or dashboards with various slopes or angles while allowing the dual-vision system 200 to remain fixed in a vertical position.

Figure 10:
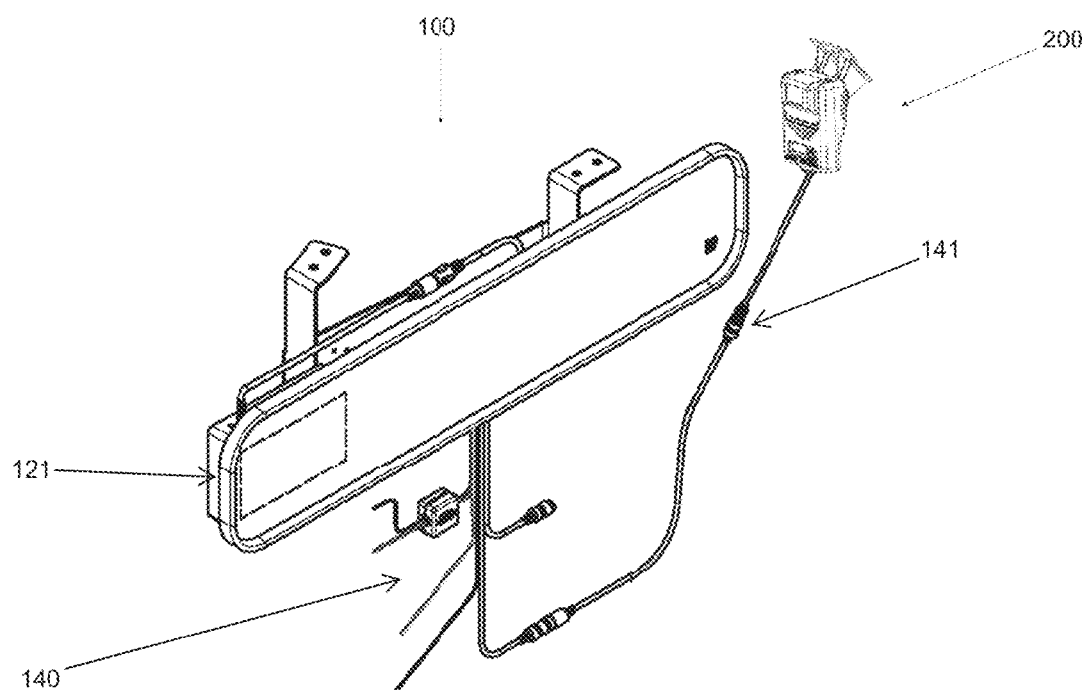
FIG. 10 depicts the rear-view mirror and modular monitor assembly with the dual-vision camera system of FIGS. 8a-b shown connected to an input in accordance with some embodiments of the invention.

FIG. 10 depicts a rear-view mirror and modular monitor assembly with the dual-vision camera system of FIGS. 8*a*-*b* shown connected to an input in accordance with some embodiments of the invention. In some embodiments, the input feeds 141 of connection device 140 may be used to deliver recorded video to the monitor display 121. In some embodiments, the one or more monitors include wireless and/or blue tooth receivers/connections to receive the data wirelessly for display. For example, as shown in FIG. 10, pre-recorded video captured by the dual-vision camera system may be played back in the monitor display 121 by plugging the camera system into an input feed 141, using the video switch 180 to select the corresponding input feed 141, and then causing the dual-vision camera system to play the recorded video, which will then output onto the monitor display 121. The use of the input feeds 141 is not limited to the dual-vision monitor system. Rather, any suitable video-providing device may advantageously be coupled to an input feed 141 and/or wireless connection for display on one or more monitors, including, for example, a digital video recorder, a portable computing device, additional cameras, etc. Any suitable connector may be used for the input feed 141 and/or wireless connection to be connected to, or releasably coupled to, the corresponding output of a video-providing device. In some embodiments, the vehicle operator is advantageously enabled to view an event/situation involving backup, opening a door, passenger/student behavior inside and/or outside a bus on the one or more monitors.

In some embodiments, analogous to those discussed above, the monitor display 121 can be used as a Driver Information Center. In such embodiments, the modular monitor 120 can be configured to accept data signals and generate corresponding visual indicia on the monitor display 121 for the driver's immediate information. For example, one or more data signals indicating a vehicle malfunction (e.g., low oil, overheating, tire failure/underinflation, etc.), vehicle system operation and/or other data received and/or available to the driver and/or vehicle can serve as inputs into the modular monitor(s) 120, which then generates a corresponding visual indication on monitor display 121. Alternatively, an external system or data device that generates video indicia of a warning condition can be coupled to one or more of the input feeds 141 to generate a corresponding warning indication on the monitor display 121. In some embodiments, the one or more monitors include wireless and/or blue tooth receivers/connections to receive the data wirelessly for display.

Figure 11:
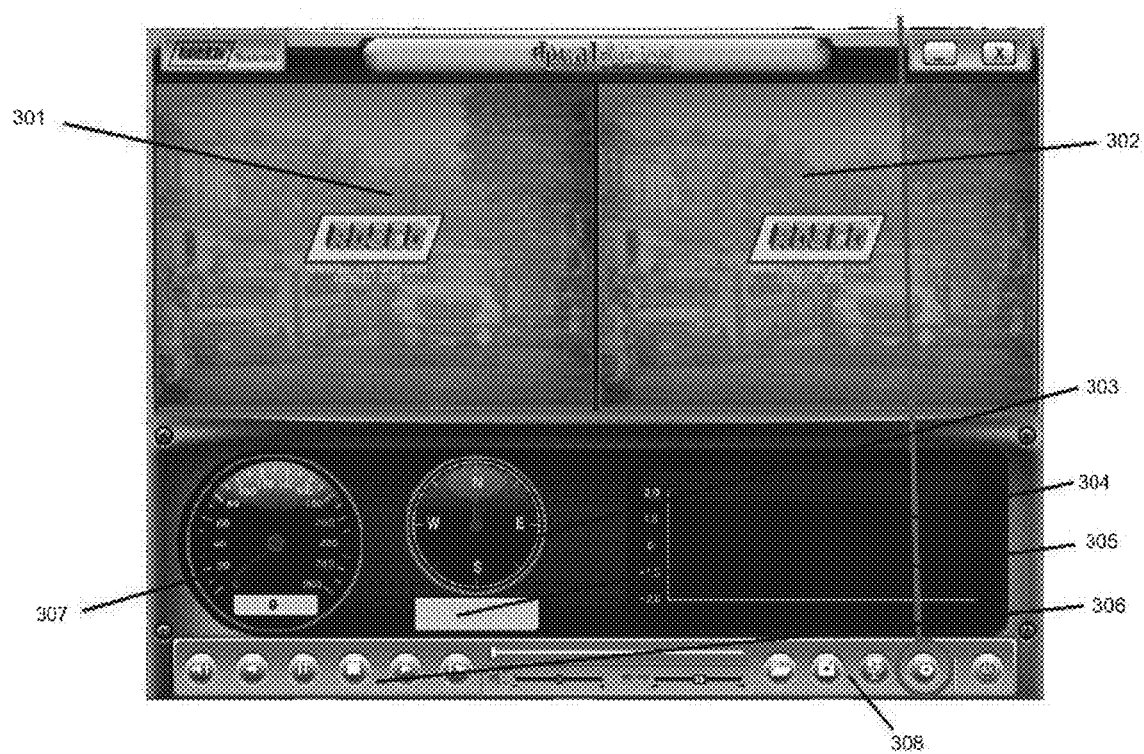
FIG. 11 depicts a screen view of review software which may be used in conjunction with a rear-view mirror and modular monitor input in accordance with some embodiments of the invention.
Figure 13A:
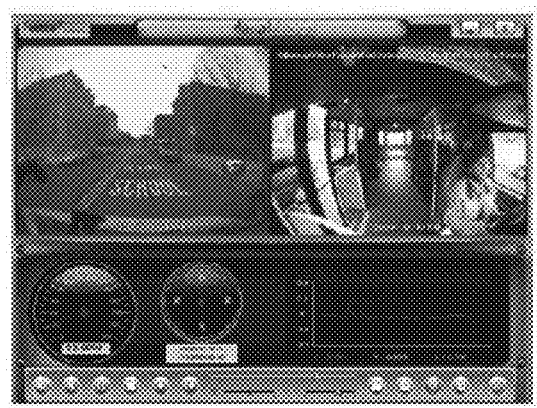
FIGS. 13a-b depict yet other alternative embodiments of the review software of FIG. 11 in accordance with some embodiments of the invention.
Figure 13B:

FIG. 11 depicts a screen view of review software which may be used in conjunction with a rear-view mirror and modular monitor input in accordance with some embodiments of the invention. In some embodiments, rear-view mirror and modular monitoring system 100 and dual-vision camera system 200 can be used in conjunction with the review software on a computer system. The review software as disclosed in U.S. patent application Ser. No. 12/608,600 cited above, and incorporated herein by reference, is as follows: Referring to FIG. 11, one embodiment of review software 300 is depicted. As shown, windows 301 and 302 are provided to allow viewing of the video captured by a first camera and a second camera. As will be appreciated, additional cameras and associated windows may be provided for the system to allow captured video in other directions. Referring to FIGS. 13*a* and 13*b*, clicking on one of windows 301 or 301 with a mouse temporarily enlarges the window to provide more detail for review. A second click on an enlarged window returns the window to its original size. Referring again to FIG. 11, compass 303 indicates the direction of travel of the vehicle during the portion of video under review. Direction of travel of the vehicle may be determined at the time of recording by one or more of a compass or a GPS receiver. GPS coordinate window 304 indicates the location of the vehicle at during the portion of the video under review in longitude and latitude. The GPS coordinates can be determined at the time of recording by one or more of a GPS receiver or dead reckoning device. Window 305 indicates the output of the 2-d or 3-d accelerometers and displays vehicle motion and any impact detected by the accelerometers graphically in 3-axis. Playback controls 306 allow a user to play, fast forward, rewind, play in slow motion and stop video playback of one or both camera video output. Playback controls also allow the user to change the playback speed of the video of one or both cameras. In addition, playback controls 306 allow personnel to advance or reverse the video of one or both of the cameras frame by frame. Controls also provide for volume adjustment of associated audio recordings. Speedometer 307 indicates the speed of the vehicle during the portion of video under review. Speed of the vehicle may be determined at the time of recording by one or more of a vehicle speedometer or a GPS receiver. The file controls 308 allow a file to be opened, conversion of the file into AVI format (or other appropriate file format), link the recorded data with a map, access other system features, e.g., a system setup menu, exit or close the review program and hide or close the review window(s).

Figure 12:
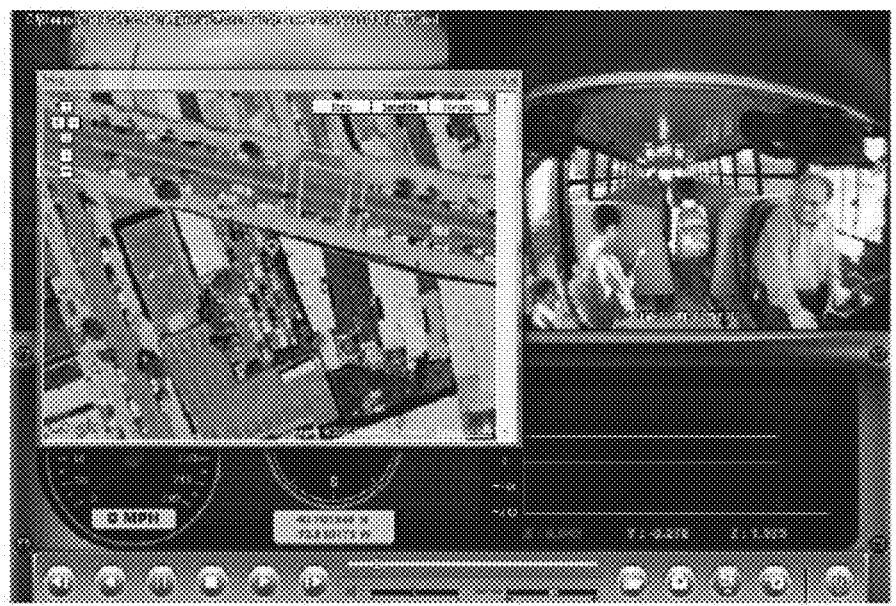
FIG. 12 depicts an alternative embodiment of the review software of FIG. 11 in accordance with some embodiments of the invention.

FIG. 12 depicts an alternative embodiment of the review software of FIG. 11 in accordance with some embodiments of the invention. Referring to FIG. 12, according to an alternative embodiment of the review software, a reviewer is able to simultaneously view video captured by one or both cameras in addition to a map displaying the position of the vehicle at the time the video was captured. The position of the vehicle is determined with an associated GPS receiver, which is recorded in memory as described elsewhere in this disclosure. According to various embodiments, the camera system is configured to work with third-party mapping software, for example, Google Earth that allows a user to view positions in satellite photos of the vehicle location.

FIGS. 13a-b depict yet other alternative embodiments of the review software of FIG. 11 in accordance with some embodiments of the invention. Referring to FIGS. 13a and 13b, an embodiment of the review software is depicted. The review software is advantageously configured to allow a user to select a video window for enlargement so that a user may inspect detail within the video. The user may select one or both of the video captured by the first camera or the second camera to be enlarged. The user may select the video for enlargement by clicking a mouse or other indication peripheral device or by one or more keystrokes on a keyboard.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A rear-view mirror unit and modular monitor system for enhanced viewing by a vehicle operator of areas within or exterior to a bus or public transit vehicle comprising:
   a rear-view mirror unit mounted forward of the vehicle operator, said rear-view mirror unit;
   at least one monitor module removably connected to said rear-view mirror unit, said at least one monitor module viewable through said rear-view mirror unit, and said at least one monitor module removable from and reconnectable to said rear-view mirror unit without affecting the structure or position of said rear-view mirror unit; and
   a first image capture device mounted at a first location on the vehicle and configured to capture and transmit at least a first image to said at least one monitor module, the first image being displayable on said at least one monitor module through said rear-view mirror unit.

2. The system of claim 1, wherein said rear-view mirror unit comprising a first area and a second area, and the first area and the second area are configured to be visually substantially similar when the at least one monitor module is not in use when viewed at least from a position at or near the vehicle operator.

3. The system of claim 2, further comprising a video input switch configured to selectively activate said at least one mirror monitor module to display the first image received from said first image capture device and to deactivate said at least one mirror monitor module so as not to display the first image responsive to predetermined criteria including at least one of a manually selected view, an automatically selected view, and an event-triggered selected view, and wherein the first area and the second area are configured to be visually substantially similar when said video input switch deactivates said at least one monitor module.

4. The system of claim 1, further comprising a gasket disposed between the rear-view mirror unit and the monitor module, said gasket being configured to channel visible light emitted from a display on the monitor module through the rear-view mirror unit, while providing protection for the display when the monitor module is fastened to the rear-view mirror unit.

5. The system of claim 1, wherein said rear-view mirror unit comprises a first area having a first reflectivity and a second area having a second reflectivity, and wherein the first reflectivity is substantially the same as the second reflectivity.

6. The system of claim 4, wherein said rear-view mirror unit comprises a first area having a first reflectivity and a second area having a second reflectivity, and wherein the first reflectivity and the second reflectivity are between 25% and 40%.

7. The system of claim 4, wherein said rear-view mirror unit comprises a first area having a first reflectivity and a second area having a second reflectivity, and wherein the first reflectivity and the second reflectivity are between 30% and 35%.

8. The system of claim 1, wherein said rear-view mirror unit comprises a first area having a first reflectivity and a second area having a second reflectivity, and wherein the first reflectivity is different than the second reflectivity.

9. The system of claim 8, wherein the first reflectivity is between 20% and 30% and the second reflectivity is greater than 30%.

10. The system of claim 8, wherein the first reflectivity and the second reflectivity are between 20% and 60%.

11. The system of claim 8, wherein the first reflectivity is about 30% and the second reflectivity is about 45%.

12. The system of claim 1, further comprising:
at least one image storage device configured for storage of the at least one image transmitted by said first image capture device; and
a protective enclosure encasing the first image capture device and the image storage device.

13. The system of claim 1, further comprising:
a second image capture device mounted at a second location on the vehicle, and configured to capture and transmit a second image to the at least one monitor module; and
an input switch connected to the first image capture device and the second image capture device, and configured to provide at least one of the first image and the second image to the at least one monitor module responsive to at least one of a manually selected view, an automatically selected view, and an event-triggered selected view,
wherein the at least one monitor module further comprises at least two channels configured to respectively receive the first image and the second image, the at least one monitor module further configured to display the first image and the second image one of together in a multiple-feed configuration and individually in a single-feed configuration responsive to the input switch.

14. The system of claim 1, further comprising a first audio capture device mounted on the vehicle, and the at least one monitor module further comprising a first audio input and at least one audio output device,
wherein the first audio capture device is configured to capture a first audio signal and provide the first audio signal to the first audio input of the at least one monitor module,
wherein the at least one audio output device of the at least one monitor module is configured to provide the first audio signal to the vehicle operator, and
wherein the at least one monitor module is configured to provide the first audio signal to the vehicle operator responsive to the first image being displayed on the at least one monitor module.

15. The system of claim 1, wherein said rear-view mirror unit comprises a first area having a first reflectivity and a second area having a second reflectivity, and wherein the rear-view mirror unit further comprises a transition region disposed between the first area and the second area, the transition region have at least a reflectivity that is different from the first reflectivity and the second reflectivity.

16. The system of claim 1, wherein said rear-view mirror unit further comprises a mirror unit backing, the mirror unit backing including a cut-out portion aligned with the first area of said rear-view mirror unit, and wherein said at least one monitor module is removably connected to the mirror unit backing and is aligned with the cut-out portion of the mirror unit backing and aligned with the first area of said rear-view mirror unit.

17. The system of claim 1, wherein said rear-view mirror unit further comprises:
a mirror unit backing including a cut-out portion aligned with the first area of said rear-view mirror unit; and
a plurality of fasteners removably connecting said at least one monitor module to said mirror unit backing around a perimeter of the cut-out portion and aligning said at least one monitor module with the cut-out portion of the mirror unit backing and the first area of said rear-view mirror unit.

18. The system of claim 1, wherein a rear side of said a rear-view mirror comprises a mirror unit backing including an aperture, and said at least one monitor module is configured to be inserted in the aperture of the mirror unit backing, fastened to the mirror unit backing using fasteners and aligned with the at least one of the see-through mirror glass section and the display aperture.

19. A method of applying a reflective coating to a mirror of a rear-view mirror unit and installing a modular monitor system for enhanced viewing by a vehicle operator of areas within or exterior to a bus or public transit vehicle, the method comprising:
applying at least a first reflective coating of a first reflective material on a front surface of a mirror substrate for the mirror;
applying a mask over a first area of the first reflective coating, the mask having a size and position on the mirror substrate corresponding to a size and mounting position of a monitor module configured to display an image through the first area;
applying at least a second reflective coating of a second reflective material on the first reflective coating;
removing the mask from the first area; and
installing at least one monitor module viewable through the first area of said rear-view mirror unit and to said rear-view mirror unit, said at least one monitor module being removable from and reconnectable to said rear-view mirror unit without affecting the structure or position of said rear-view mirror unit.

20. The method of claim 19, wherein the at least a first reflective coating and the at least a second reflective coating are selected so that the first area has a first reflectivity of not less than about 20% and a second area of the mirror comprising the second reflective coating has a second reflectivity of not less than about 20%, and wherein the first reflectivity of the first area and the second reflectivity of the second area are configured to be substantially visually similar when the at least one monitor module is not displaying the image.

21. The method of claim 19, wherein the first reflectivity is different than the second reflectivity.

22. A method of displaying an image on a rear-view mirror unit mounted forward of a vehicle operator using a modular monitor system for enhanced viewing by a vehicle operator of areas within or exterior to a bus or public transit vehicle, the rear-view mirror unit having a first area with a first reflectivity not less than about 20% and a second area with a second reflectivity not less than about 20%, comprising:

capturing, by a first image capture device mounted at a first location in the vehicle at least a first image;

transmitting, by the first image capture device, the first image to at least one monitor module removably connected to the rear-view mirror unit, the first image being displayable on the at least one monitor module through a first area of the rear-view mirror unit and viewable through the first area of the rear-view mirror unit having the first reflectivity and configured to be substantially similar to the second area with the second reflectivity when the first image is transmitted to the at least one monitor module and when viewed at least from a position at or near the vehicle operator, and the at least one monitor module removable from and reconnectable to said rear-view mirror unit without affecting the structure or position of said rear-view mirror unit.

23. The method of claim 22, wherein the transmitting is in response to receiving a stop completed signal indicating that the vehicle has completed a stop and is preparing to resume a journey, and the first location provides a view of an external side of the vehicle.

24. The method of claim 22, wherein the first location provides a view of an external rear of the vehicle, and the method further comprises, in response to receiving a backup signal indicating that the vehicle is preparing to backup, preventing display of the first image on the at least one monitor module.

\* \* \* \* \*